(12) United States Patent
Chakrabarty et al.

(10) Patent No.: US 10,895,854 B1
(45) Date of Patent: Jan. 19, 2021

(54) SYSTEM AND METHOD FOR CONTROL CONSTRAINED OPERATION OF MACHINE WITH PARTIALLY UNMODELED DYNAMICS USING LIPSCHITZ CONSTANT

(71) Applicant: Mitsubishi Electric Research Laboratories, Inc., Cambridge, MA (US)

(72) Inventors: Ankush Chakrabarty, Cambridge, MA (US); Devesh Jha, Cambridge, MA (US); Yebin Wang, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 13 days.

(21) Appl. No.: 16/502,713

(22) Filed: Jul. 3, 2019

(51) Int. Cl.
| | |
|---|---|
| *G05B 13/00* | (2006.01) |
| *G05B 13/02* | (2006.01) |
| *G06F 17/17* | (2006.01) |
| *G05B 13/04* | (2006.01) |
| *G06K 9/62* | (2006.01) |
| *G05B 19/048* | (2006.01) |

(52) U.S. Cl.
CPC ......... *G05B 13/027* (2013.01); *G05B 13/042* (2013.01); *G05B 19/048* (2013.01); *G06F 17/17* (2013.01); *G06K 9/6256* (2013.01)

(58) Field of Classification Search
None
See application file for complete search history.

(56) References Cited

U.S. PATENT DOCUMENTS

| | | | | |
|---|---|---|---|---|
| 6,463,371 B1* | 10/2002 | Ulyanov | ............... | B60G 17/018 701/36 |
| 2014/0372078 A1* | 12/2014 | Gheorghe | ............. | G01M 17/00 702/183 |
| 2017/0201198 A1* | 7/2017 | Wang | ...................... | H02P 21/14 |
| 2020/0032731 A1* | 1/2020 | Milanese | ................ | G06F 30/15 |

(Continued)

OTHER PUBLICATIONS

Adhikary et al. 'Sliding mode control of position commanded robot manipulators' Control Engineering Practice 81 (2018) 183-198.*

(Continued)

*Primary Examiner* — Bernard G Lindsay
(74) *Attorney, Agent, or Firm* — Gene Vinokur

(57) ABSTRACT

A control system for controlling a machine with partially modeled dynamics to perform a task estimates a Lipschitz constant bounding the unmodeled dynamics of the machine, initializes a constraint-admissible control policy using the Lipschitz constant for controlling the machine to perform a task, such that the constraint-admissible control policy satisfies stability constraint, safety and admissibility constraint including one or combination of a state constraint and an input constraint, and has a finite cost on the performance of the task, and jointly controls the machine and update the control policy to control an operation of the machine to perform the task according the control policy starting with the initialized constraint-admissible control policy and to update the control policy using data collected while performing the task. In such a manner, the updated control policy is constraint-admissible.

20 Claims, 22 Drawing Sheets

(56) References Cited

U.S. PATENT DOCUMENTS

2020/0183339 A1* 6/2020 Shi ...................... G06N 3/0454

OTHER PUBLICATIONS

Salehi et al. 'Active Sampling based Safe Identification of Dynamical Systems using Extreme Learning Machines and Barrier Certificates' 2019 International Conference on Robotics and Automation (ICRA) Palais des congres de Montreal, Montreal, Canada, May 20-24, 2019.*

Pathak et al. 'Verification and repair of control policies for safe reinforcement learning' Appl Intell (2018) 48:886-908.*

* cited by examiner $$\|\phi(x_1) - \phi(x_2)\| \leq \mathcal{L}^\star \|x_1 - x_2\|$$

1101, 1111

$$\begin{bmatrix} \|\phi_1(x_1) - \phi_1(x_2)\| \\ \|\phi_2(x_1) - \phi_2(x_2)\| \\ \vdots \\ \|\phi_n(x_1) - \phi_n(x_2)\| \end{bmatrix} \leq \begin{bmatrix} \mathcal{L}_1^\star \|x_1 - x_2\| \\ \mathcal{L}_2^\star \|x_1 - x_2\| \\ \vdots \\ \mathcal{L}_n^\star \|x_1 - x_2\| \end{bmatrix}$$

Algorithm 1 Kernelized Lipschitz Estimation

Require: Initial dataset, $\{x_k, \phi(C_q x_k)\}_{k=1}^{N}$
Require: Confidence parameter, $0 < \beta \ll 1$
1: $\{(q_k, \phi(q_k))\} \leftarrow$ Estimate $C_q$ via ARD
2: for $k$ in $1, \ldots, N$ do
3:     for $j$ in $\{1, \ldots, N\} \setminus k$ do
4:         $\ell \leftarrow$ append $\ell_{jk}$ computed by (9)
5: $\hat{L}_n \leftarrow$ KDE with cross-validated $\mathcal{K}$ and $h$ using $\{\ell_r\}$
6: $\hat{S}_n \leftarrow$ compute using (11)
7: $\hat{\mathcal{L}}_\phi \leftarrow \max(\hat{S}_n)$.

FIG. 16

SYSTEM AND METHOD FOR CONTROL CONSTRAINED OPERATION OF MACHINE WITH PARTIALLY UNMODELED DYNAMICS USING LIPSCHITZ CONSTANT

TECHNICAL FIELD

The invention relates generally to system control, and more particularly to methods and apparatus for safe control of a constrained machine having only a partial model of dynamics of the system.

BACKGROUND

Control theory in control systems engineering is a subfield of mathematics that deals with the control of continuously operating dynamical systems in engineered processes and machines. The objective is to develop a control policy for controlling such systems using a control action in an optimum manner without delay or overshoot and ensuring control stability.

For example, optimization-based control and estimation techniques, such as model predictive control (MPC), allow a model-based design framework in which the system dynamics and constraints can directly be taken into account. MPC is used in many applications to control dynamical systems of various complexities. Examples of such systems include production lines, car engines, robots, numerically controlled machining, satellites and power generators. However, in a number of situations, an analytical model of a controlled system is unavailable, difficult to update in real-time, or inaccurate. Examples of such cases are prevalent in robotics, building control (HVAC), vehicles, smart grids, factory automation, transportation, self-tuning machines, and traffic networks.

With presents of only partial (uncertain) models of dynamical systems, some control methods exploit operational data generated by these systems in order to construct feedback control policies that stabilize the system dynamics, or embed quantifiable control-relevant performance. The use of data to design control policies is called data-driven control. There are two kinds of data-driven control methods: indirect methods that first construct a model of the system and then leverage the model to design controllers, or direct methods that directly construct control policies from data without the intermediate model-building step. A drawback of indirect methods is the potential requirement of large quantities of data in the model-building phase. Conversely, direct methods require less data. However, even cutting-edge direct control methods experience difficulties in handling state and input constraints that are imperative for maintaining safe operation in closed-loop control systems.

For example, reinforcement learning (RL) is an area of machine learning concerned with how to take actions in an environment so as to maximize some notion of cumulative reward (or equivalently, minimize a cumulative loss/cost). Reinforcement learning is closely related with optimal control in continuous state-input spaces, which is concerned mostly with the existence and characterization of optimal control policies, and algorithms for their computation in the absence of a mathematical model of the controlled system and/or environment.

However, current RL methods are not suitable for data-driven control of constrained systems. This is because the conventional RL methods do not consider state and input constraint satisfaction in continuous state-action spaces; that is, conventional RL cannot guarantee that the states of the controlled system operated with control inputs satisfy state and input constraints throughout the operation. A problem of conventional RL is that during an exploration stage, the RL perturbs the system with different inputs to learn the states corresponding to the control inputs. Moreover, to better learn a system, it is beneficial to use control inputs approaching physical boundaries of possible constraints. Because there is no model, there is no guarantee that arbitrarily selected control inputs and/or boundary-valued control inputs will not direct the system state to an area outside the specified state constraint set, thereby resulting in the violation of state constraints.

Accordingly, there is a need for a system and a method for control of a system with unmodeled dynamics subject to state and control input constraints for operational safety.

SUMMARY

It is an object of some embodiments to provide a system and a method for data-driven control of a system with partially modeled dynamics subject to state and control input constraints. Additionally, or alternatively, it is an object of some embodiments to provide such a method that can guarantee arrival on an optimum control policy for performing a task with practical amount of task-agnostic training data.

Some embodiments are based on recognition that if a model of dynamics of the controlled system is known, it is possible to design a linear or non-linear controller for performing a task. However, when the model is only partially known, which is the case for majority of practical systems, the controller designed with the partially known model is not-feasible and unsafe. However, some embodiments are based on realization that such a deficiency of a controller designed from partially known model can be compensated using data driven technique. Moreover, the size of the data required for compensating the unmodeled dynamics has a practical magnitude and the type of the data is not required to be task specific.

Specifically, some embodiments are based on realization that for designing a feasible and safe controller starting from a partial model of dynamics of the system and unknown unmodeled dynamics it is not necessary to learn those unmodeled dynamics in their entirety. Such learning would generally require a lot of training data. In contrast, it is sufficient to estimate only bounds of the unmodeled dynamics or the rates of change of the unmodeled dynamics, which requires less data to learn. Leveraging this information makes such a control policy estimation practical. For example, one embodiment estimates Lipschitz constants of components of the unmodeled dynamics from the training data, which allows to design the initial constraint-admissible and safe control policy from the Lipschitz constant using various optimization methods. Moreover, the training data needed for estimation of Lipschitz constant is task-agnostic, i.e., may or may not come from the task-specific operation. For example, training data can be diagnostic data typically collected after the first installation of the system where a human operator ensures safe data collection.

In combination, task-agnostic excitation of the system to collect training data, representation of the unknown unmodeled dynamics with Lipschitz constants derived from the training data, initialization of the feasible and safe control policy for performing a task subject to constraint using the Lipschitz constants, and iterative update of the control policy so that every updated policy is safe while performing a task allows to converge to the optimal safe control policy for a system with partially known dynamics, while guaranteeing constraint satisfaction throughout the initialization and updating on operation of the system for performing a task. This is something that, to the best of our knowledge, has not been done before. In addition, some embodiments are based on realization that to generate linear or non-linear optimal control policy, the initialized control policy can be linear or non-linear. It means that to learn the optimal non-linear control policy it is sufficient to initialize only a linear control policy for performing a task subject to constraints, and iteratively update function approximators capable of generating non-linear control policies from this initial linear control policy.

Accordingly, one embodiment discloses a control system for controlling a machine with partially modeled dynamics to perform a task, that includes an input interface configured to accept training data of operation of the machine, each instance of the training data is indicative of a triple of a state of the machine, a control input applied to the machine at the state of the instance, and an update of the state of the machine in response to the applied control input of the instance; a processor configured to estimate at least one Lipschitz constant bounding the unmodeled dynamics of the machine, wherein the unmodeled dynamics cause a difference between a measured state of the machine and a predicted state of the machine estimated with a partial model of dynamics of the machine; initialize a constraint-admissible control policy using the Lipschitz constant for controlling the machine to perform a task, such that the constraint-admissible control policy satisfies stability constraint, safety and admissibility constraint including one or combination of a state constraint and an input constraint, and has a finite cost on the performance of the task; and jointly control the machine and update the control policy to control an operation of the machine to perform the task according the control policy starting with the initialized constraint-admissible control policy and to update the control policy using data collected while performing the task, wherein the updated control policy is constraint-admissible.

Another embodiment discloses a control method for controlling a machine with partially modeled dynamics to perform a task, wherein the method uses a processor coupled with stored instructions implementing the method, wherein the instructions, when executed by the processor carry out steps of the method, that includes accepting training data of operation of the machine, each instance of the training data is indicative of a triple of a state of the machine, a control input applied to the machine at the state of the instance, and an update of the state of the machine in response to the applied control input of the instance; estimating at least one Lipschitz constant bounding the unmodeled dynamics of the machine, wherein the unmodeled dynamics cause a difference between a measured state of the machine and a predicted state of the machine estimated with a partial model of dynamics of the machine; initializing a constraint-admissible control policy using the Lipschitz constant for controlling the machine to perform a task, such that the constraint-admissible control policy satisfies stability constraint, safety and admissibility constraint including one or combination of a state constraint and an input constraint, and has a finite cost on the performance of the task; and jointly controlling the machine and updating the control policy to control an operation of the machine to perform the task according the control policy starting with the initialized constraint-admissible control policy and to update the control policy using data collected while performing the task, wherein the updated control policy is constraint-admissible.

Yet another embodiment discloses a non-transitory computer readable storage medium embodied thereon a program executable by a processor for performing a method, the method includes accepting training data of operation of the machine, each instance of the training data is indicative of a triple of a state of the machine, a control input applied to the machine at the state of the instance, and an update of the state of the machine in response to the applied control input of the instance; estimating at least one Lipschitz constant bounding the unmodeled dynamics of the machine, wherein the unmodeled dynamics cause a difference between a measured state of the machine and a predicted state of the machine estimated with a partial model of dynamics of the machine; initializing a constraint-admissible control policy using the Lipschitz constant for controlling the machine to perform a task, such that the constraint-admissible control policy satisfies stability constraint, safety and admissibility constraint including one or combination of a state constraint and an input constraint, and has a finite cost on the performance of the task; and jointly controlling the machine and updating the control policy to control an operation of the machine to perform the task according the control policy starting with the initialized constraint-admissible control policy and to update the control policy using data collected while performing the task, wherein the updated control policy is constraint-admissible.

BRIEF DESCRIPTION OF THE DRAWINGS

FIG. 11 is an illustration of Lipschitz constants for scalar and vector-valued functions, according to some embodiments;

FIG. 16 is a pseudocode of Lipschitz learning or Lipschitz constant estimation, according to some embodiments;

DETAILED DESCRIPTION

It is an object of some embodiments to provide a system and a method for controlling an operation of a machine using a data-driven state feedback optimal controller. It is another object of some embodiments to provide such a controller that is suitable for controlling a machine subject to safety constraints. An example of such a data-driven optimal controller uses constrained approximate dynamic programming (ADP) to determine constrained control policies based on data obtained during the operation of the controlled machine. The ADP based adaptive control performs iteratively. For simplicity of presentation, this disclosure discusses methodology within one iteration, which can be repeated as long as necessary for the control application.

Figure 1A:
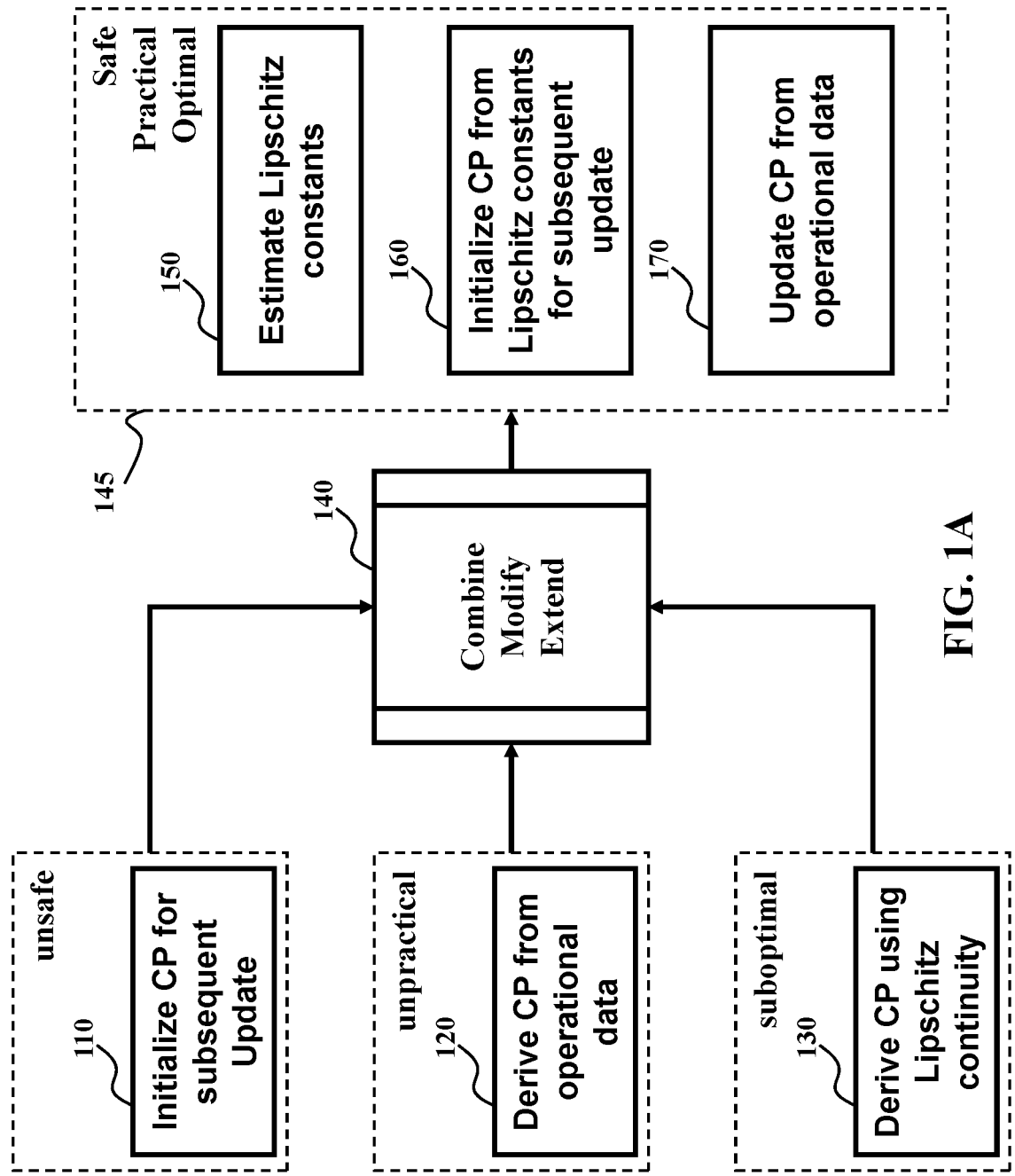
FIG. 1A is a schematic of some principles employed by some embodiments for designing a control policy for controlling a machine.

FIG. 1A is a schematic of some principles employed by some embodiments for designing a control policy for controlling a machine. For example, one control design paradigm initializes a control policy (CP) 110 with subsequent update of the initialized control policy from operational data. Such an initialization is typically rudimental and/or arbitrarily. For example, the initial control policy can maintain an initial, e.g., default, state of a machine. For example, if the machine is a vehicle, such an initial control policy would maintain the vehicle in a stationary position. In theory, the subsequent update of an initial control policy can gradually arrive on an optimal control policy, however, such an update is not safe and can result in violation of constraints on operation of a machine. For example, if the machine is a vehicle, the principle of control design 110 can move the vehicle to a desired destination, but do not guarantee absence of accidence during the travel.

In another control design paradigm, the control policy can be fully derived 120 from operational data for performing a task that is similar or identical to the task on hand. However, for practical applications, the amount of training data and computational effort for designing safe and optimal control policy is impractical. In some cases, the safe operation of the system cannot be guaranteed. The main reason such a method would be inefficient is that one has to learn the system properties that are task dependent and thus, not use any prior knowledge which could be task agnostic to design controllers for a particular task. Such a method would require enormous amount of training during commissioning for any new task.

Yet another control design paradigm 130 simplifies the design using some assumption of the control policy. Example of such assumptions include Lipschitz continuity of a dynamical system. The design of the control policy designed under these conditions requires less training data, but does not guarantee optimality of the control. This method requires less training data as one needs estimate only a few parameters, i.e., the Lipschitz constant for the unmodeled dynamics and furthermore, the Lipschitz constant for a dynamical system is task agnostic. As a result, the learning of the Lipschitz constant occurs only once and it can be used to design feasible controllers which can be used for a range of different tasks.

Some embodiments combine, modify, and/or extend 140 those control design principles to arrive on safe, practical, and optimal control policy 145. Specifically, some embodiments are based on realization that for designing a constraint-admissible control policy starting from a partial model of dynamics of the system and unknown unmodeled dynamics it is not necessary to learn those unmodeled dynamics in their entirety. Such learning would generally require a lot of training data. In contrast, it is sufficient to estimate only bounds of the unmodeled dynamics or the rates of change of the unmodeled dynamics, which requires less data to learn. Leveraging this information makes such a control policy estimation practical. For example, one embodiment estimates 150 Lipschitz constants of components of the unmodeled dynamics from the training data, which allows to initialize 160 a constraint-admissible (feasible and safe) control policy from the Lipschitz constant using various optimization methods. Moreover, the training data needed for estimation of Lipschitz constant is task-agnostic, i.e., may or may not come from the task-specific operation. For example, training data can be diagnostic data typically collected after the first installation of the system where a human operator ensures safe data collection. In addition, such an initial constraint-admissible control policy can be optimize 170 using operational data collected while performing the task to arrive on optimal constraint-admissible control policy.

Figure 1B:
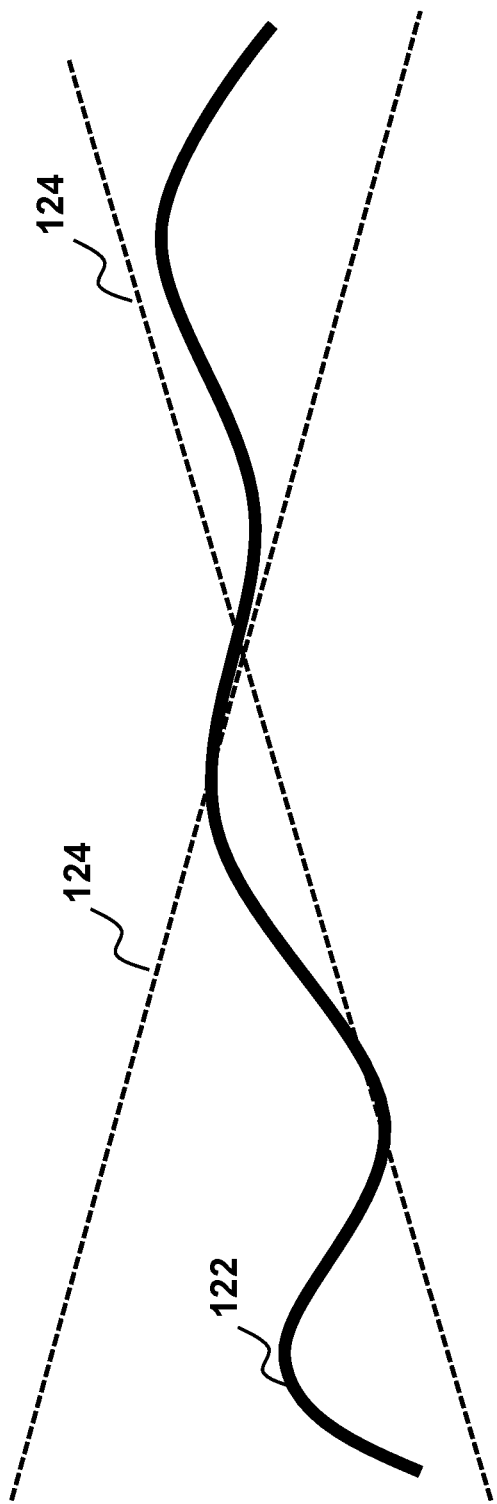
FIG. 1B is a schematic of principles of Lipschitz constant for a dynamical system which is estimated for generating feasible control policy by some embodiments

FIG. 1B is a schematic of principles of Lipschitz constant of a dynamical system which is estimated during the learning process, thus allowing to initialize and update constraint-admissible control policy by some embodiments. Some embodiments are based on recognition that Lipschitz constants bound the unmodeled dynamics of the system causing a difference between a measured state of the system and a predicted state of the system estimated with a partial model of dynamics of the system. Hence, the Lipschitz constants can be used for ensuring safety in spite of unmodeled dynamics. Specifically, the rate of change of the unmodeled dynamics 122 is bounded because the function \phi of the unmodeled dynamics is Lipschitz continuous. These bounds 124 ensure that the unmodeled dynamics 122 can be contained within a region described by the Lipschitz constant, and therefore, the embodiments can design a controller that is robust to any unmodeled dynamics within those bounds 124 without knowing the exact form of the unmodeled dynamics 122. Since such a controller can reject the effect of any function within the bounds 124, it is a safe control policy as long as it is designed to be safe with respect to the known model dynamics. Notably, the bounds 124 of the unmodeled dynamics 122 do not depend on the task performed by a machine under control. To that end, the Lipschitz constants can be derive from task-agnostic excitation of the machine, e.g., can be derived from diagnostic data of the performance of the machine collected during initial installation and testing of the machine. In effect, the Lipschitz constants can be estimated in a practical manner with reasonable (practical) amount of the training data.

However, while the bounds 124 defined by the Lipschitz constants can ensure safety of the controller, the actual unmodeled dynamics 122 is still unknown. Hence, the control policy designed using only the knowledge of the Lipschitz constants is safe, but suboptimal. To that end, the embodiments update the control policy during an operation of the machine controlled in a safe manner by the initialized control policy to arrive on safe and optimal control policy in a practical manner 145.

In addition, some embodiments are based on realization that to generate linear or non-linear optimal control policy, the initialized control policy can be linear or non-linear. It means that to learn the optimal non-linear control policy it is sufficient to initialize only a linear control policy for performing a task subject to constraints, and iteratively update function approximators capable of generating non-linear control policies from this initial linear control policy.

Figure 2A:
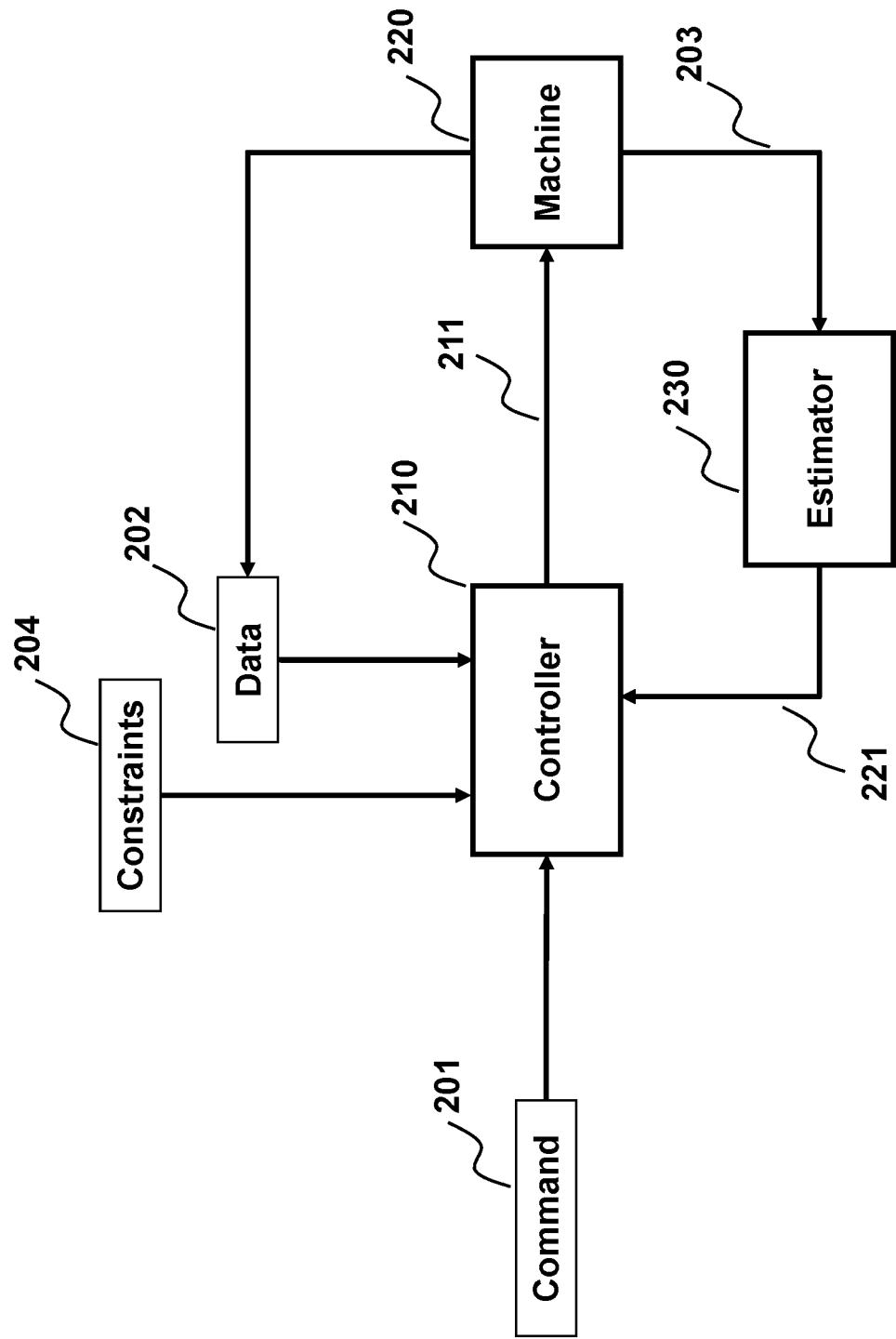
FIG. 2A is a block diagram of a data-driven constrained controller and feedback system, according to some embodiments of the invention.

FIG. 2A shows an example of a controlled machine, such as a machine 220, controlled by a data-driven controller 210 according to some embodiments. In some implementations, the data-driven controller uses a reinforcement learning methodology that performs approximate dynamic programming according to data 202 obtained during the operation of the machine 220. The controller includes an input interface to accept the data 202 indicative of the state of the machine. Examples of the input interface includes network control interface configured to accept data transmitted thorough wired or wireless communication channel. The data 202 can include state 221, output 203, and/or control input 211 obtained at the current time or stored from previous times, as well as previous and current constraint-admissible invariant set (CAIS) with previous and current control policy. In various embodiments, the data 202 can include training data indicative of triples of a current state of the system, a control input applied to the system at the current state, and an update of the current state of the system in response to the applied control input. These triples of the training data may not necessarily belong to a continuous trajectory of operation of the system. As used herein, the data indicative of values include one or combination of values and transformation of the values.

The state 221 can include the measurements 203 as well as transformations of the measurements performed by a state-estimator 230. Examples of state estimator includes: the identity function $I(x)=x$, in systems when the full-state feedback is available, or approximate differentiators with low-pass filters to estimate the derivatives of the output, from which a state estimate can be obtained for systems where the states are derivatives of the output; as an example, consider an output of system position, where states are positions, velocities, and acceleration (derivatives of position).

The machine and control system is designed to satisfy constraints 204 that arise from safety considerations, physical limitations, and/or specifications, limiting the range where the outputs, the inputs, and also possibly the states of the machine are allowed to operate. The constraints 204 are defined in continuous space. For example, state constraints are defined in continuous state space of the machine and control input constraints are defined in continuous control input space.

During the operation, the controller receives a command 201 indicating the desired behavior of the machine. The command can include, for example, a value of the desired torque generated by the machine. In response to receiving the command 201, the controller generates a control signal 211 that serves as a control input for the machine 220. In response to the input 211, the machine updates the output 203 of the machine. Based on measurements of the output 203 of the machine, the estimator 230 updates the estimated state 221 of the machine. This estimated state 221 of the machine provides the state-feedback to the controller 210.

The machine 220, as used herein, is any apparatus that can be controlled by an input signal (input). The input signal can be associated with physical quantities, such as voltages, pressures, forces, etc. The machine produces an output signal (output). The output can represent a motion of the machine and can be associated with other physical quantities, such as currents, flows, velocities, positions. Typically, the output is related to a part or all of the previous output signals, and to a part or all of the previous and current input signals. However, the outputted motion of the machine may not be realizable due to constraints on the machine during its operation. The input and output are processed by a controller.

The operation of the machine 220 can be modeled by a set of equations representing changes of the output over time as functions of current and previous inputs and previous outputs. During the operation, the machine can be defined by a state of the machine. The state of the machine is any set of information, in general time varying, that together with the model and future inputs, can define future motion. For example, the state of the machine can include an appropriate subset of current and past inputs and outputs.

The controller 210 can be implemented in hardware or as a software program executed in a processor, e.g., a microprocessor, which at fixed or variable control period sampling intervals receives the estimated state 221 of the machine 220 and the desired motion command 201 and determines, using this information, the inputs, e.g., the control signal 211, for operating the machine. The estimator 230 can be implemented in hardware or as a software program executed in a processor, either the same or a different processor from the controller 210, which at fixed or variable control period sampling intervals receives the outputs 203 of the machine and determines, using the new and the previous output measurements, the estimated state 221 of the machine.

Figure 2B:
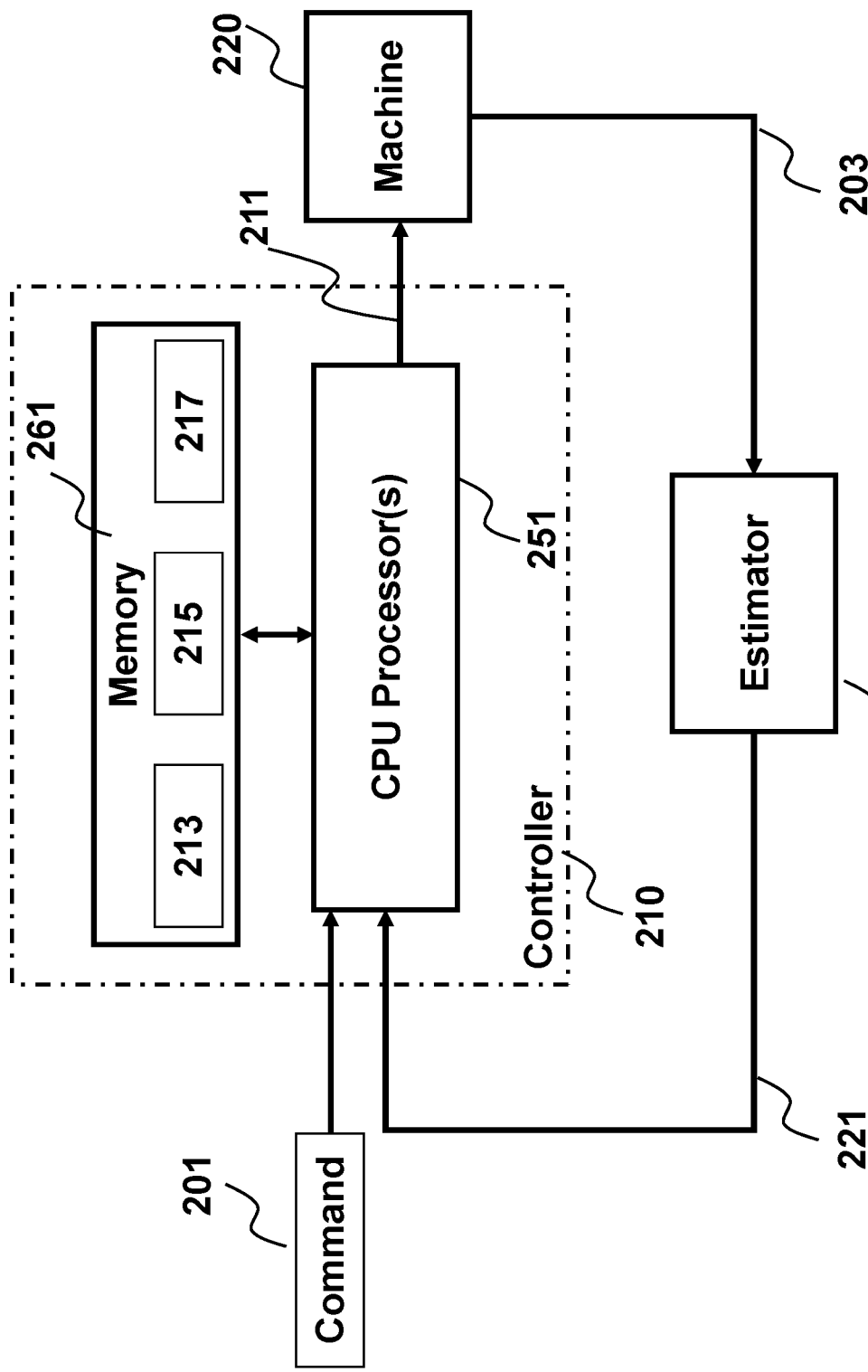
FIG. 2B is a block diagram of a data-driven controller, implemented using CPU processor(s) and memory, and a feedback system, according to some embodiments.

FIG. 2B shows a block diagram of a controller according to some embodiments. The controller 210 actuates the machine 220 such that the estimated state 221 of the machine 220 and output 203 follow a command 201. The controller 210 includes or operated by a computer, e.g., in the form of a single central processing unit (CPU) or multiple CPU processors 251 connected to memory 261 for storing the constraints 213 and the data 215 on the operation of the machine. The memory 261 is also configured to store 217 a constraint admissible invariant set (CAIS) of states of the machine satisfying the state constraints and a corresponding control policy mapping a state of the machine within the CAIS to a control input satisfying the control input constraints, such that a control of the machine having the state within the CAIS according to the corresponding control policy maintains the state of the machine within the CAIS.

Some embodiments consider a dynamical machine $$x_{t+1}=F(x_t,u_t)$$

$$q_t=C_q x_t$$

where $x_t \in \mathbb{R}^{n_x}$ and $u_t \in \mathbb{R}^{n_u}$ denote the state and the control input of the system respectively and $t \in \mathbb{N}$ is the time instant. For simplicity of exposition, the partial model of dynamics of the machine can be written as $$x_{t+1} = Ax_t + Bu_t + G\phi(q_t)$$

$$q_t = C_q x_t \quad (1)$$

where the system matrices A, B, G and $C_q$ have appropriate dimensions. Denote by $\phi \in \mathbb{R}^{n_\phi}$ the system's uncertainty, or unmodeled linear or nonlinear dynamics, whose argument $q=q_t \in \mathbb{R}^{n_q}$ is represented by a linear combination of the state. The origin is an equilibrium state for the system above, that is, $\phi(0)=0$.

In some implementations, the matrix B is known, e.g., predetermined. The matrix G has full column rank and is sparse and all entries are 0 or 1. Only the non-zero element locations of G are known. The matrix $C_q$ and the unmodeled dynamics $\phi$ are unknown. In some embodiments, the matrix G is completely unknown, and is assumed to be the identity matrix. In such cases, the data will reveal that some components of $\phi$ will be zero.

Figure 3A:
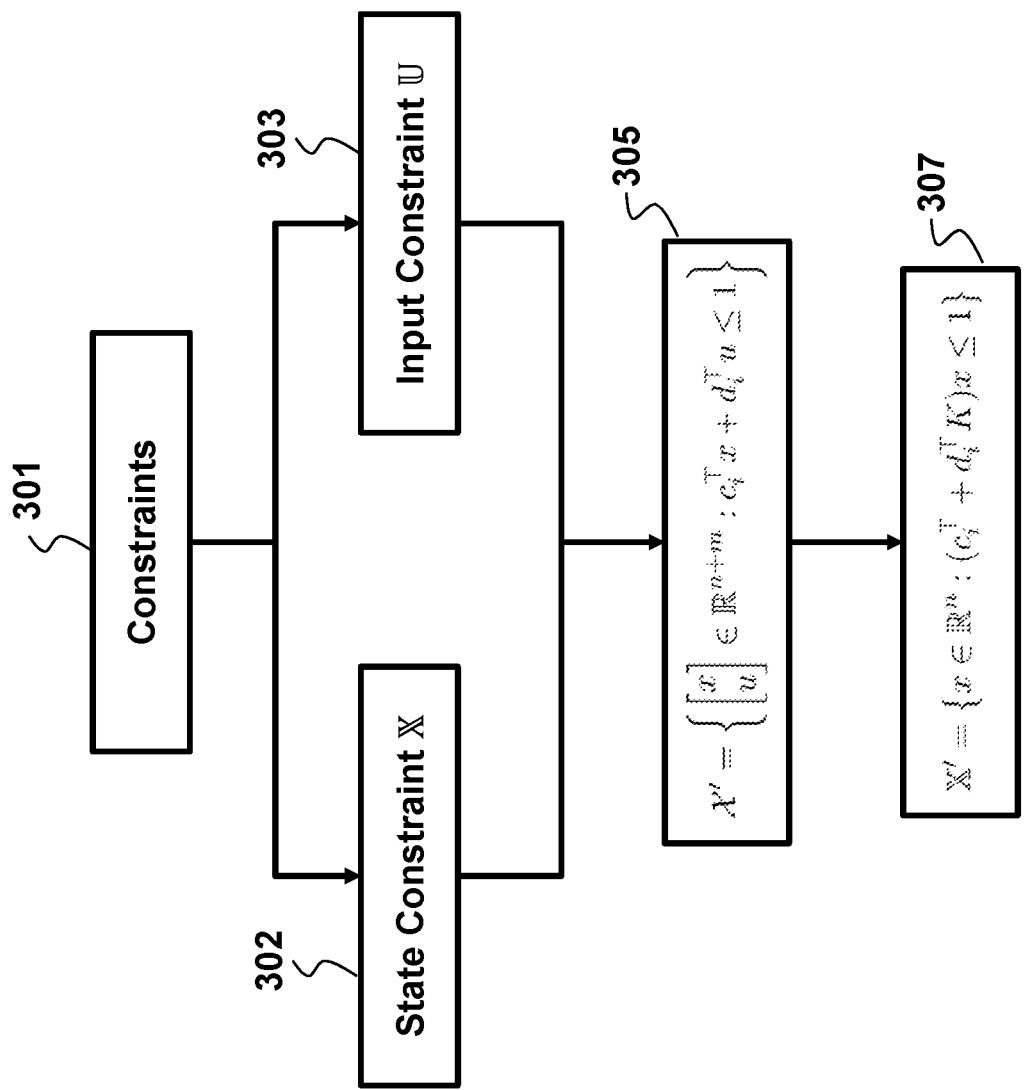
FIG. 3A is a schematic of state and control input constraints defined for the machine and a mathematical description of these constraints, according to some embodiments.

FIG. 3A shows a schematic of exemplar constraints 301 enforced by a controller according to some embodiments. The constraints 301 includes state constraints $\mathbb{X}$ 302 defined in continuous space of the state of the machine 120 and control input constraints $\mathbb{U}$ 303 defined in continuous space of the control inputs to the machine 120. Exemplar constraints 301 can be represented by polytopic sets 305. With any fixed linear control policy u=Kx, the polytopic constraint set 305 is represented using the compact representation 307. In the representations 305 and 307, setting $c_i=0$ implies that the ith constraint is a constraint on the control input only, and setting $d_i=0$ implies that the ith constraint is a constraint on the machine state only. In one exemplar embodiment, the constraints 307 include both the state and the control input constraints.

Figure 3B:
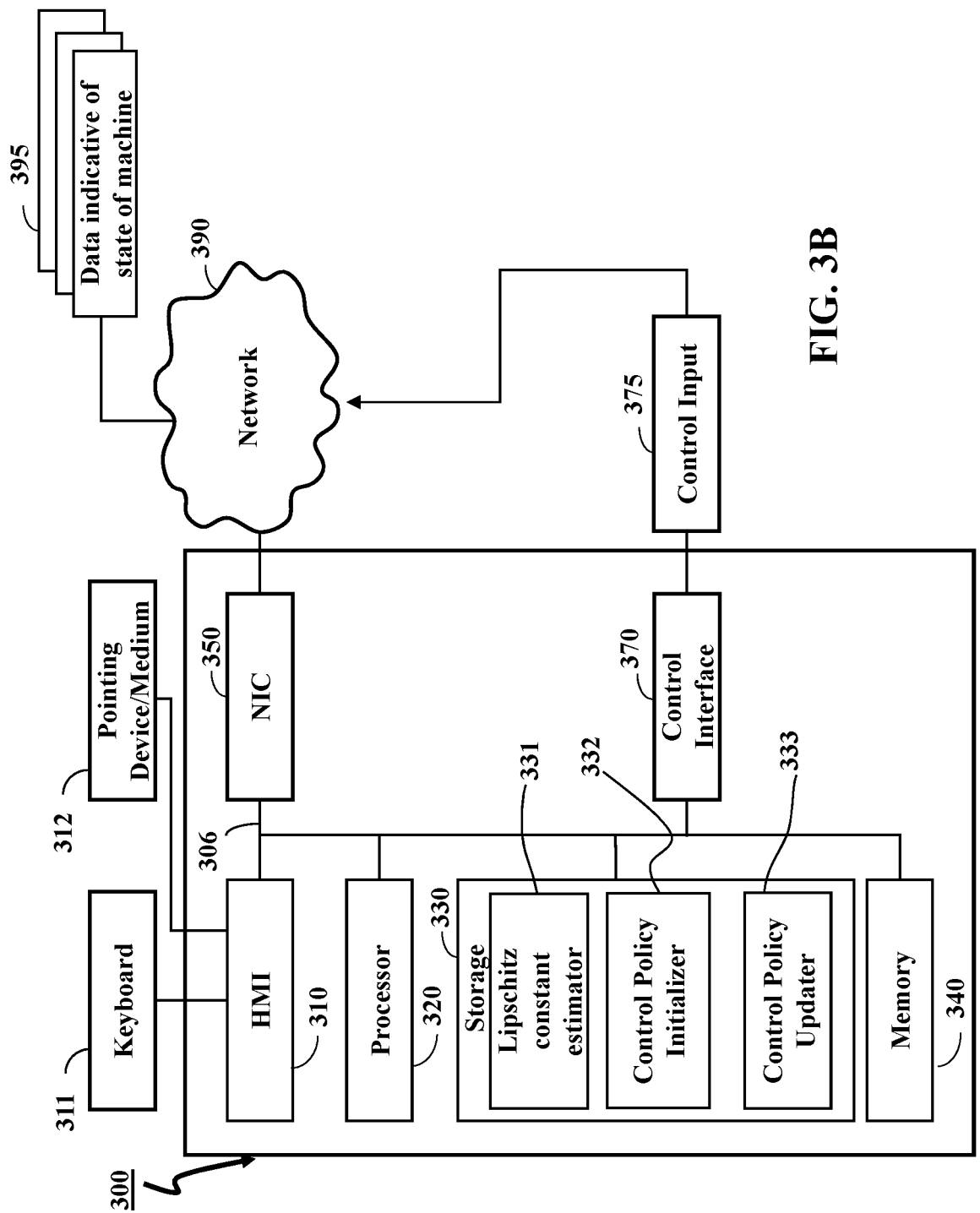
FIG. 3B shows a block diagram of a control system or controller for controlling a machine.

FIG. 3B shows a block diagram of a control system or controller 300 for controlling a machine with partially modeled dynamics to perform a task subject to state constraints in continuous state space of the machine and subject to control input constraints in continuous control input space of the machine in accordance with some embodiments. The controller 300 can have a number of interfaces connecting the controller 300 with other machines and devices. A network interface controller 350 is adapted to connect the controller 300 through the bus 306 to a network 390 connecting the controller 300 with the controlled machine 220. To that end, the controller includes an output interface, e.g., a control interface 370, configured to submit the sequence of control inputs 375 to the machine 220 through the network 390 and includes an input interface, e.g., a network interface controller (NIC) 350 configured to accept through the network 390 the data 395 indicative of the state of the machine 220.

The data 395 can include one or combination of training data operation of the machine and operational data of machine collected during controlling the machine to perform a task. Each instance of the training data is indicative of a state of the machine, a control input applied to the machine at the state of the instance, and an update of the state of the machine in response to the applied control input of the instance. For example, each instance of training data is a triple of state, control input and corresponding update of the state. Additionally, or alternatively, each instance of training data includes a function of such a triple. The training data may be task-agnostic and does not have to form a continuous trajectory. The operational data include similar types of triples of state, control input and corresponding update of the state collected during the operation of the machine for performing the task.

The controller 300 can also include other types of input and output interfaces. For example, the controller 300 can include a human machine interface 310. The human machine interface 310 can connect the controller 300 to a keyboard 311 and pointing device 312, wherein the pointing device 312 can include a mouse, trackball, touchpad, joy stick, pointing stick, stylus, or touchscreen, among others.

The controller 300 includes a processor 320 configured to execute stored instructions, as well as a memory 340 that stores instructions that are executable by the processor. The processor 320 can be a single core processor, a multi-core processor, a computing cluster, or any number of other configurations. The memory 340 can include random access memory (RAM), read only memory (ROM), flash memory, or any other suitable memory machines. The processor 320 can be connected through the bus 306 to one or more input and output devices.

The processor 320 is operatively connected to a memory storage 330 storing the instruction as well as processing data used by the instructions. The storage 330 can form a part of or be operatively connected to the memory 340. For example, the memory storage can store the state constraints and the input constraints for the machine 220. Additionally, or alternatively, the memory storage is configured to store a value function of states of the machine and a corresponding admissible control policy mapping the state of the machine 220 to a control input satisfying the control input constraints 303.

The processor 320 is configured to jointly control the machine using a control policy and update the control policy from data collected during the control. Notably, such a joint control and update is performed in a safe, practical and optimal manner. To that end, for performing the joint control and update, the processor is configured to execute a Lipschitz constant estimator 331 to estimate at least one Lipschitz constant bounding the unmodeled dynamics of the machine, wherein the unmodeled dynamics cause a difference between a measured state of the machine and a predicted state of the machine estimated with a partial model of dynamics of the machine, and to execute control policy initializer 332 to initialize a constraint-admissible control policy using the Lipschitz constant for controlling the machine to perform a task. As used herein, such a constraint-admissible control policy satisfies stability constraint, safety and admissibility constraint including one or combination of a state constraint and an input constraint, and has a finite cost on the performance of the task. Next, the processor is configured to jointly control the machine and update the control policy. Specifically, the processor is configured to execute a control interface 370 to control an operation of the machine to perform the task according the control policy starting with the initialized constraint-admissible control policy and to execute a control policy updater 333 to update the control policy using data collected while performing the task, wherein the updated control policy is constraint-admissible.

In combination, task-agnostic excitation of the machine to collect training data, representation of the unknown unmodeled dynamics with Lipschitz constants derived from the training data, initialization of the feasible and safe control policy for performing a task subject to constraint using the Lipschitz constants, and iterative update of the control policy so that every updated policy is safe while performing a task allows to converge to the optimal safe control policy for a system with partially known dynamics, while guaranteeing constraint satisfaction throughout the initialization and updating on operation of the system for performing a task. This is something that, to the best of our knowledge, has not been done before.

Figure 4:
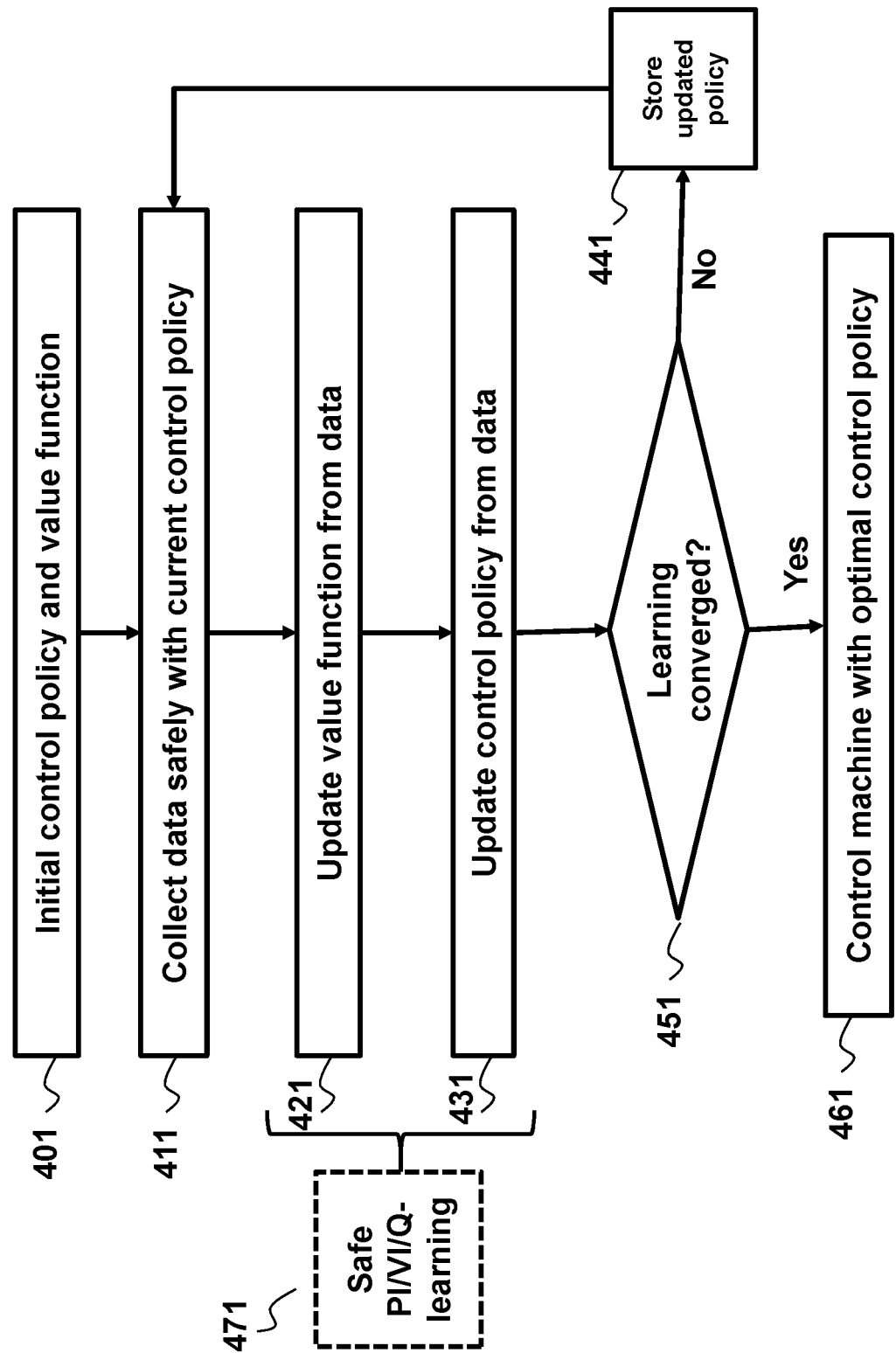
FIG. 4 is a flowchart of the high-level steps involved in typical reinforcement learning based control methods such as policy iteration (PI), value iteration (VI), or Q-learning, according to some embodiments.

FIG. 4 shows a flow chart of a method for controlling a machine with partially modeled dynamics to perform a task according some embodiments. The method is executed by the processor 320 and implemented using executable models 331, 332, 333 stored in the memory 340. The processor 320 is configured to store an initial control policy and value function 401; such an initial control policy needs to be safe, and could be suboptimal, in order to converge asymptotically with data to the optimal policy. The memory 340 stores data 411 collected safely during operation with the initial control policy. The processor 320 is configured to jointly control the machine and update the value function and the control policy. To that end, for performing the joint control and update 421, the processor is configured collect data 421 including a sequence of control inputs 375 generated using current control policy and a sequence of states 395 of the machine corresponding to the sequence of control inputs; and execute a safe policy iteration/value iteration/Q-learning 471 solver to update the value function 421 and the control policy 431 subject to safety constraints. Update control policies 441 are also stored in the memory 340. One embodiment is configured to repeat the joint control and update until a termination condition 451 is met. Example of terminal condition can be the end of the control. Additionally, or alternatively, one embodiment upon reaching a termination condition produces an optimal control policy, and after that controls the machine using the optimal control policy. Some embodiments are based on realization supported by experiments and mathematical proof that iterative update of suboptimal but safe control policies using some reinforcement learning principles asymptotically converges to an optimal control policy 461 for control of a constrained machine without violating the constraints of the machine and without the need for knowledge of a dynamical model of the machine.

Given a control policy $u(x)$, some embodiments define an infinite horizon cost functional given an initial state $x_0 \in \mathbb{R}^{n_x}$ as $$\mathcal{J}(x_0, u) := \sum_{t=0}^{\infty} \gamma^t \mathcal{U}(x_t, u(x_t)),$$

where $\mathcal{U}$ is a positive definite function with $\mathcal{U}(0,0)=0$ and $\{x_k\}$ denotes the sequence of states generated by the closed loop system:

$$x_{t+1} = Ax_t + Bu(x_t) + G\phi(C_q x_t) \qquad (1)$$

In some embodiments, the scalar $\gamma \in (0,1]$ is a forgetting/discount factor intended to enable the cost to be emphasized more by current state and control actions and lend less credence to the past.

A continuous control policy $u(\cdot): \mathbb{R}^{n_x} \to \mathbb{R}^{n_u}$ is an admissible control policy on $X \subset \mathbb{R}^{n_x}$ if it stabilizes the closed loop system on $X$ and $\mathcal{J}(x_0, u)$ is finite for any initial state $x_0$ in $X$. We want to design an optimal control policy that achieves the optimal cost $$\mathcal{J}_\infty(x_0) = \inf_{u \in \mathcal{U}_0} \mathcal{J}(x_0, u)$$

for any initial state $x_0$ in X. Here, $\mathcal{U}_0$ denotes the set of all admissible control policies. In other words, we wish to compute an optimal control policy $$u_\infty = \arg \inf_{u \in \mathcal{U}_0} \mathcal{J}(x_0, u).$$

Directly constructing such an optimal controller is very challenging for general nonlinear systems; this is further exacerbated because the system contains uncertain dynamics. Therefore, we shall use adaptive/approximate dynamic programming (ADP): a class of iterative, data-driven algorithms that generate a convergent sequence of control policies whose limit is mathematically proven to be the optimal control policy $u_\infty(x)$.

From the Bellman optimality principle, we know that the discrete-time Hamilton-Jacobi-Bellman equations are given by $$J_\infty(x_t) = \inf_{u \in \mathcal{U}_0} \mathcal{U}(x_t, u(x_t)) + \gamma J_\infty(x_{t+1})$$

$$u_\infty(x_t) = \arg \inf_{u \in \mathcal{U}_0} \mathcal{U}(x_t, u(x_t)) + \gamma J_\infty(x_{t+1})$$

ADP methods typically involve performing iterations over value functions and control policies in order to ultimately converge to the optimal value function and optimal control policy. The key operations in ADP methods involve setting an admissible control policy $u_0(x)$ and then iterating the policy evaluation step $$j_{k+1}(x_t) = \inf_{u \in \mathcal{U}_0} \mathcal{U}(x_t, u(x_t)) + \gamma J_{k+1}(x_{t+1})$$

$$u_{k+1}(x_t) = \arg\min_u \mathcal{U}(x_t, u(x_t)) + \gamma J_{k+1}(x_{t+1})$$

until convergence.

According to some embodiments, a necessary condition for convergence of policy iteration methods is the availability of an initial admissible control policy $u_0(x)$, which is non-trivial to derive for systems with some unmodeled dynamics. Hence, the embodiments systematically derive an initial constraint-admissible control policy using partial model information via kernelized Lipschitz learning and semidefinite programming Some embodiments also extend this idea to handle the case when the control input or state of the machine is constrained. In such cases, along with an admissible controller, one embodiment also derives a CAIS of the controller within which the control policy is guaranteed to satisfy input/state constraints and the closed-loop system remains stable. The derivation of admissible control policies with guaranteed stabilizable and/or constraint enforcement is safe initialization for ADP.

In some embodiments, the value iteration and Q-learning algorithms do not generally require an admissible control policy in order to converge optimally using data. Although this is true in off-policy implementations (that is, when the updated control policy is not used on-line), in on-policy implementations, a lack of stabilizing initial policies could result in unsafe transient behavior unless the underlying system is open-loop stable.

Figure 5:
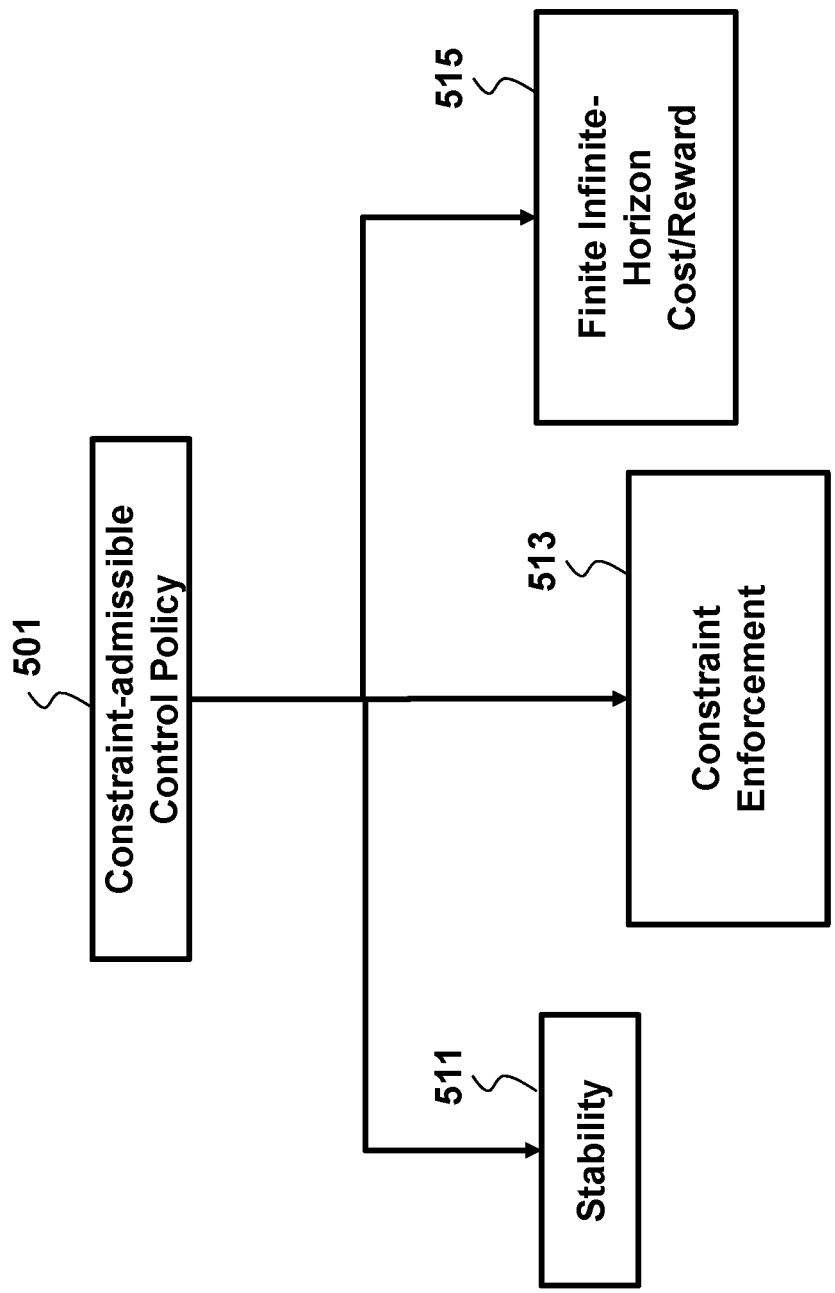
FIG. 5 is a schematic that describes the properties of a safe control policy, according to some embodiments.

FIG. 5 shows a schematic of constituents of a constraint-admissible control policy 501 used by some embodiments for constraint enforcement 513. Let u(x) denote a control policy. As used herein, a constraint-admissible control policy satisfies stability constraint, safety and admissibility constraint including one or combination of a state constraint and an input constraint, and has a finite cost on the performance of the task. In particular, a constraint-admissible control policy must be stabilizing, that is the closed-loop system with $u_t=u(x_t)$ must be asymptotically stable 511. In the presence of state or input constraints 302, 303, the control policy must generate control actions and state trajectories on the machine 220 that satisfy these constraints. Finally, a constraint-admissible control policy must induce a finite infinite-horizon cost/reward 515; that is, $J_\infty(x_t)<\infty$ for any initial state $x_t \in \mathbb{X}$ if state-constrained or $x_t \in \mathbb{R}^{n_x}$ if not. In some embodiments, a control policy is called admissible (not necessarily safe) if it is stabilizing 511 and induces finite cost 515.

Figure 7:
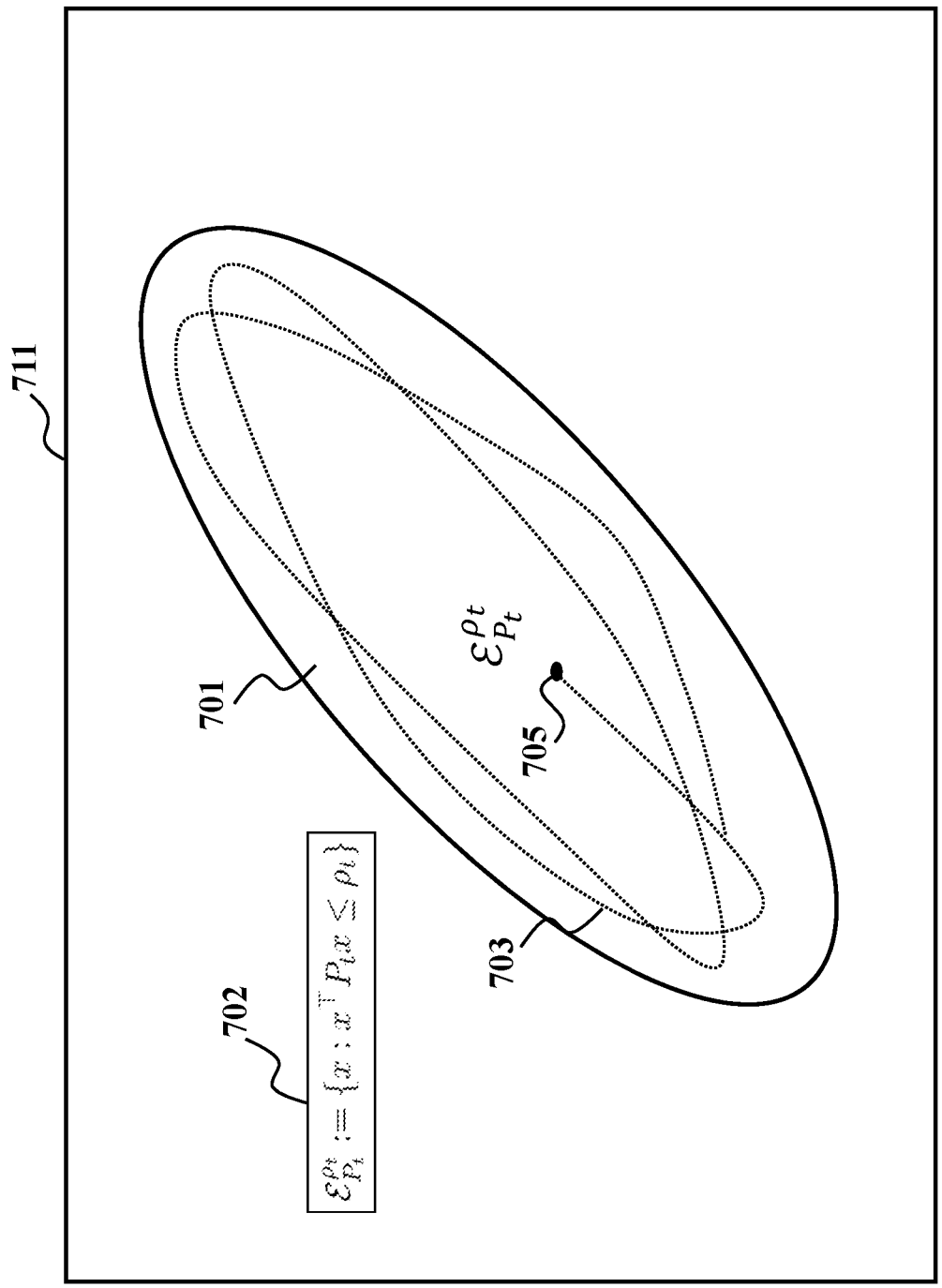
FIG. 7 is a schematic that illustrates constraint admissibility using a CAIS, according to some embodiments.

FIG. 7 shows an example of a CAIS 701 within the admissible state space 711 at time instant t parametrized by $P_t$ and $\rho_t$ in 702. An exemplar closed-loop state trajectory 703 comprising states $x_t, x_{t+1}, x_{t+2}, \ldots$ 395 generated using corresponding control policy providing control input 375 $u_t=K_t x_t, u_{t+1}=K_t x_{t+1}, \ldots$ on the machine. The state trajectory 703 is always confined to the CAIS 701 when the initial state 705 of the trajectory 703 is in the CAIS 701.

Figure 6:
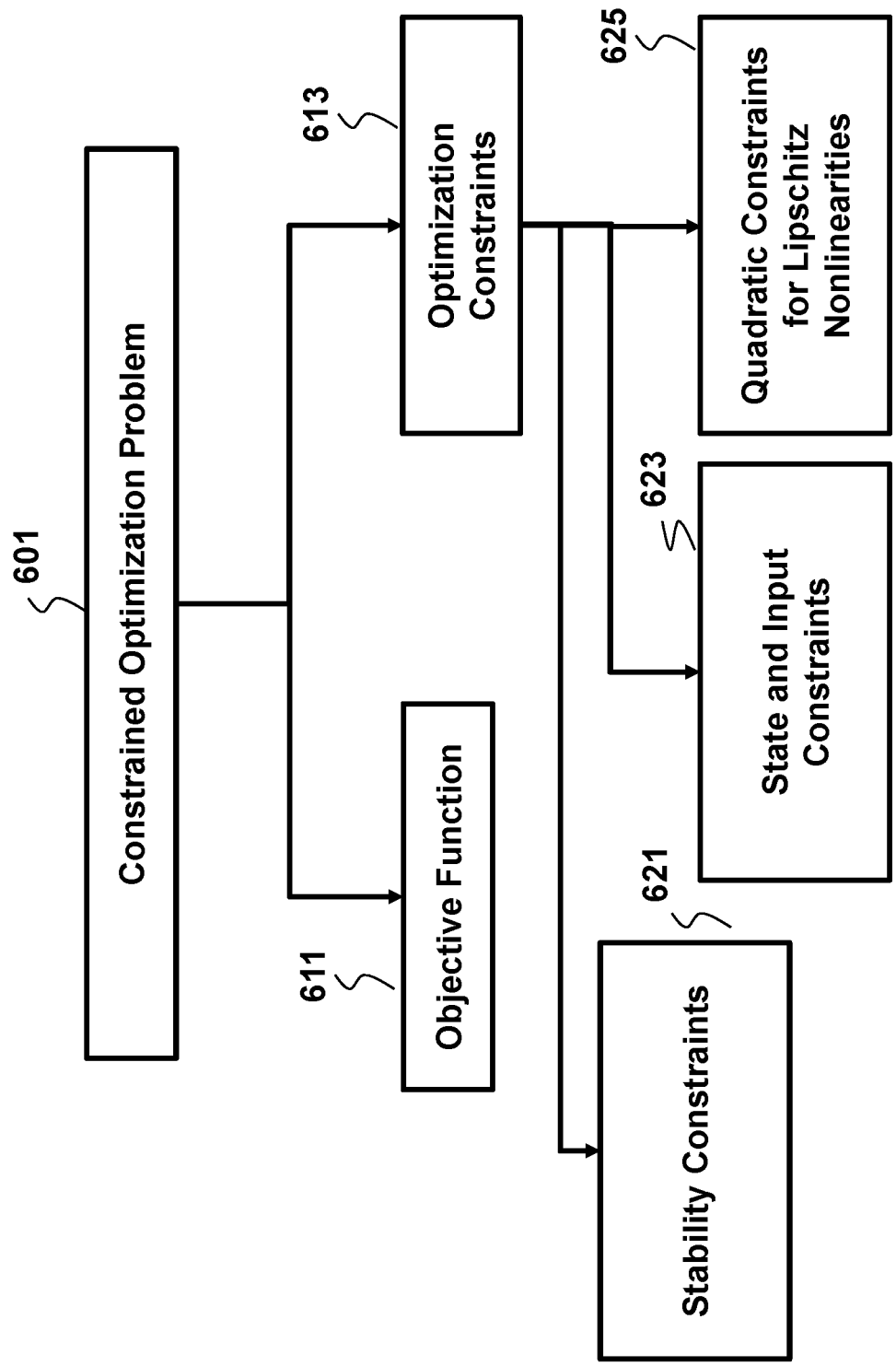
FIG. 6 is a schematic of the various components of a constrained optimization problem involved in computing a safe control policy, according to some embodiments.

FIG. 6 shows a flow chart of a method for initializing a constraint-admissible control policy using the Lipschitz constant for controlling the machine to perform a task according to some embodiments. For example, some embodiments solve a constrained optimization problem 601 to initialize the control policy. Such solution is subject to constraints 625 derive from Lipschitz constant to ensure a safe initial control policy as well as other constraints 521 and 623 to arrive on constraint-admissible control policy.

For example, the equilibrium point x=0 of the closed-loop system (1) is globally exponentially stable with a decay rate a if there exist scalars $C_0>0$ and $\alpha \in (0,1)$ such that $|x_t| \le C_0 \alpha^{(t-t_0)} |x_0|$ for any $x_0 \in \mathbb{R}^{n_x}$. A standard result for testing global exponential stability (GES) of the equilibrium state is provided next.

Let $V(\cdot,\cdot): [0, \infty) \times \mathbb{R}^{n_x} \to \mathbb{R}$ be a continuously differentiable Lyapunov function such that $$\gamma_1 |x|^2 \le V(t, x_t) \le \gamma^2 |x|^2$$

$$V(t+1, x_{t+1}) - V(t, x_t) \le -(1-\alpha^2) V(t, x_t)$$

for any $t \ge t_0$ and $x_t \in \mathbb{R}^{n_x}$ along the trajectories of the system $x^+ = \varphi(x)$, where $\gamma_1, \gamma_2$, and $\alpha$ are positive scalars, and $\varphi$ is a nonlinear function. Then the equilibrium state x=0 for the system $x^+ = \varphi(x)$ is GES with decay rate a.

The following design matrix inequalities provides a method to construct an initial linear stabilizing policy $u_0(x) = K_0 x$ such that the origin is a GES equilibrium state of the closed-loop system (1). Suppose that Assumptions 1-2 hold, and that there exist matrices $S=S^T \succ 0$, Y, and scalars $\alpha \in (0,1)$, $v>0$, $\hat{L}$ that is related to the unmodeled dynamics $\phi$ such that $$\begin{bmatrix} -\alpha^2 S & * & * & * \\ 0 & -vI & * & * \\ AS+BY & vGS & -S & * \\ \hat{L}C_q S & 0 & 0 & -vI \end{bmatrix} \preceq 0 \quad (2)$$

is satisfied, then the matrix $K_0 = YS^{-1}$ yields an admissible initial control policy $u_0 = K_0 x$ for the system (1), and ensures that the origin is a GES equilibrium state of the system with decay rate a and a Lyapunov function $V=x^T S^{-1} x$. Note that we do not need to know the unmodeled nonlinearity $\phi$ to find matrices Y and S that satisfy condition (2). Only the estimate $\hat{L}$ representing the Lipschitz constant of the unmodeled nonlinearity $\phi$ needs to be known. The inequality (2) is an optimization constraint 613 that contains stability constraints 621 and quadratic constraints for Lipschitz nonlinearities 625 through judicious estimates of $\hat{L}$.

In some embodiments, the control action and/or the state of the system is constrained for safety. For example, an input constraint can be represented by the set $$\mathbb{U} = \{u : \xi_i^T u \le 1\}$$

for $i=1, \ldots, n_c$, where n, is the number of constraints and $\xi_i \in \mathbb{R}^{n_u}$. This matrix inequality defines a polytopic input constraint set. Clearly, constraints of the form $|u| \le \bar{u}$ can be written in the form above as $$\begin{bmatrix} 0 & 1/\bar{u} & \cdots & 0 \\ 0 & -1/\bar{u} & \cdots & 0 \end{bmatrix} u \le 1$$

and each row constitutes a constraint $\xi_i$. With any control policy $u_0=K_0 x$, the constraint set described above is equivalent to the set $$\mathcal{X} = \{x : \xi_i^T K_0 x \le 1\}.$$

A CAIS can be constructed that satisfies this constraint if the following is true: the ellipsoid $$\varepsilon_P = \{x : x^T P x \le 1\}$$

is a subset of $\mathcal{X}$ if and only if $\xi_i K_0^T P^{-1} K_0 \xi_i^T \le 1$ for every $i=1, \ldots, n_c$. The further stability certificate also holds true. Let $V: [0, \infty) \times \varepsilon_P \to \mathbb{R}$ be a continuously differentiable function such that the inequalities $$\gamma_1 |x|^2 \le V(t, x_t) \le \gamma_2 |x|^2$$

$$V(t+1, x_{t+1}) - V(t, x_t) \le -(1-\alpha^2) V(t, x_t)$$

hold for any $t \ge t_0$ and $x \in \varepsilon_P$ along the trajectories of the system (1), where $\gamma_1, \gamma_2$, and $\alpha$ are positive scalars. Then the equilibrium x=0 for the system (1) is locally exponentially stable with a decay rate $\alpha$ and a CAIS $\varepsilon_P$. To satisfy the input constraints, one has to compute matrices S and Y along with scalars $\alpha, \hat{L}$, and v that satisfies (2) and $$\begin{bmatrix} 1 & * \\ y\xi_i & S \end{bmatrix} \ge 0$$

for every $i=1, \ldots, n_c$. Then with $P=S^{-1}$, we get a value function $V=x^T P x$, a control policy $u_0=YPx$ that is a safe initial control policy 501 as long as the initial state lies within the CAIS $\varepsilon_P$. This constraint is an input constraint 623 and, in some embodiments, can be extended to a state constraint with additional inequalities.

The optimization constraints 613 are linear matrix inequalities and feasible solutions can be computed effectively by solving SDPs. Since the number of feasible solutions could be large, and possibly infinite, some implementations define an objective function 611 to the constrained optimization problem 601 that yields some practical advantage. In one embodiment, the objective function 611 is to maximize the log-determinant of the matrix variable S which results in increased size of the CAIS.

Figure 8:
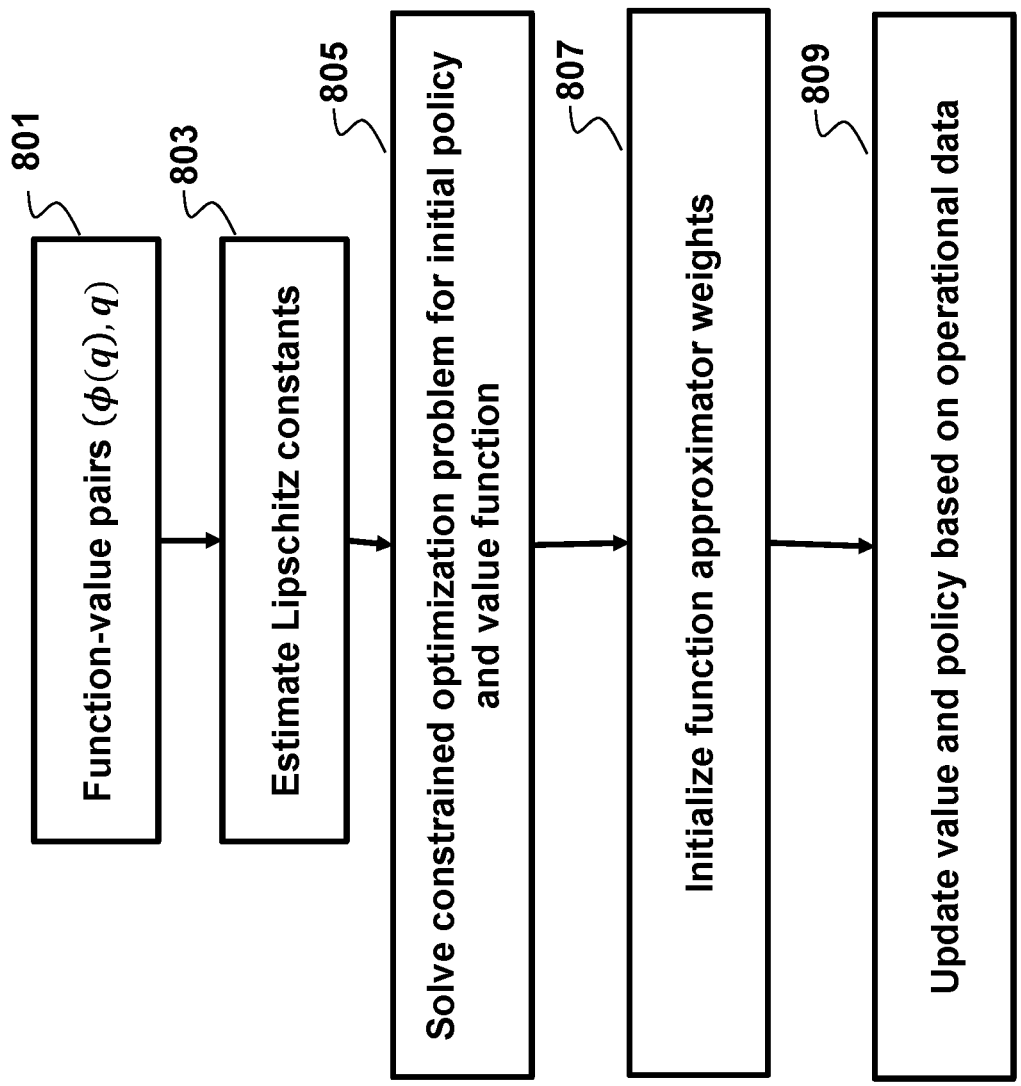
FIG. 8 is a flowchart of the key steps involved in constructing a safe initial control policy from Lipschitz constants learned from data, according to some embodiments.

FIG. 8 shows a block diagram of the workflow of safe reinforcement learning with ADP methods that have been initialized with safe initial control policies according to some embodiments. Some embodiments determine Lipschitz constants 803 from function value pairs of the unmodeled dynamics 801. As used herein, the function value pairs of the unmodeled dynamics 801 are pairs of the values of the unmodeled dynamics φ(q) and their corresponding arguments q. As described below, the arguments q are obtained from triples of a state of the system, a control input applied to the system at the corresponding state, and an update of the current state of the system in response to the applied control input.

From function value pairs of the unmodeled dynamics 801, some embodiments estimate Lipschitz constants L 803 that can be used to solve SDPs as shown above, to derive safe initial control policies and a corresponding value function 805. Since for uncertain, nonlinear systems, the optimal value function $J_\infty$ and the optimal control policy $u_\infty$ could be nonlinear, they are represented via function approximators, whose weights 807 are initialized using the safe control policy and value function computed by solving the SDP. These initialized value function approximator and policy function approximator weights 807 are then updated online 809 using operation data collected safely since every update policy is stabilizing, as a consequence of the initial policy being safe.

In some embodiments, the control policy is represented by a parametric function of a weighted combination of a set of basis functions. In such a manner, the initialization and/or update of the control policy is simplified. For example, in various implementations, the initialized control policy defines initial coefficients of the parametric function and the update of the control policy updates the coefficients of the parametric function.

Figure 9:
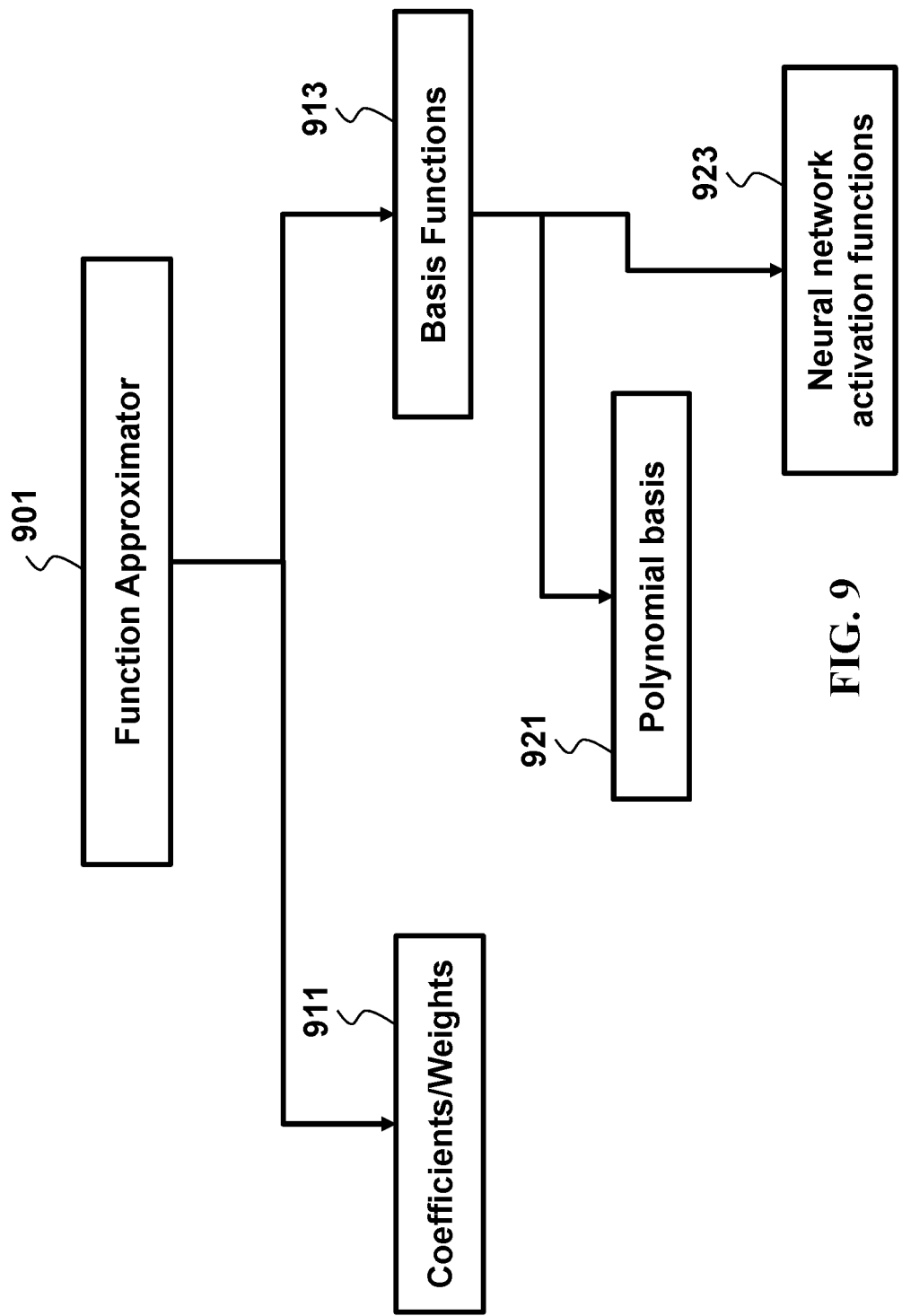
FIG. 9 is a schematic diagram of function approximators and some embodiments of the components thereof.

FIG. 9 shows a schematic of components of a parametric function approximating the control policy according to some embodiment. To approximate a wide class of nonlinear functions, some embodiments uses parametric function approximators 901 that include two components: coefficient weights 911 which are typically scalars, and basis functions 913, which are classes of functions suitable to represent nonlinearities. Some examples of basis functions 913 include polynomial basis function 921 such as Chebyshev, Hermite, or Legendre polynomials, and neural network activation functions such as rectified linear units (ReLU) or sigmoid functions.

Figure 10A:
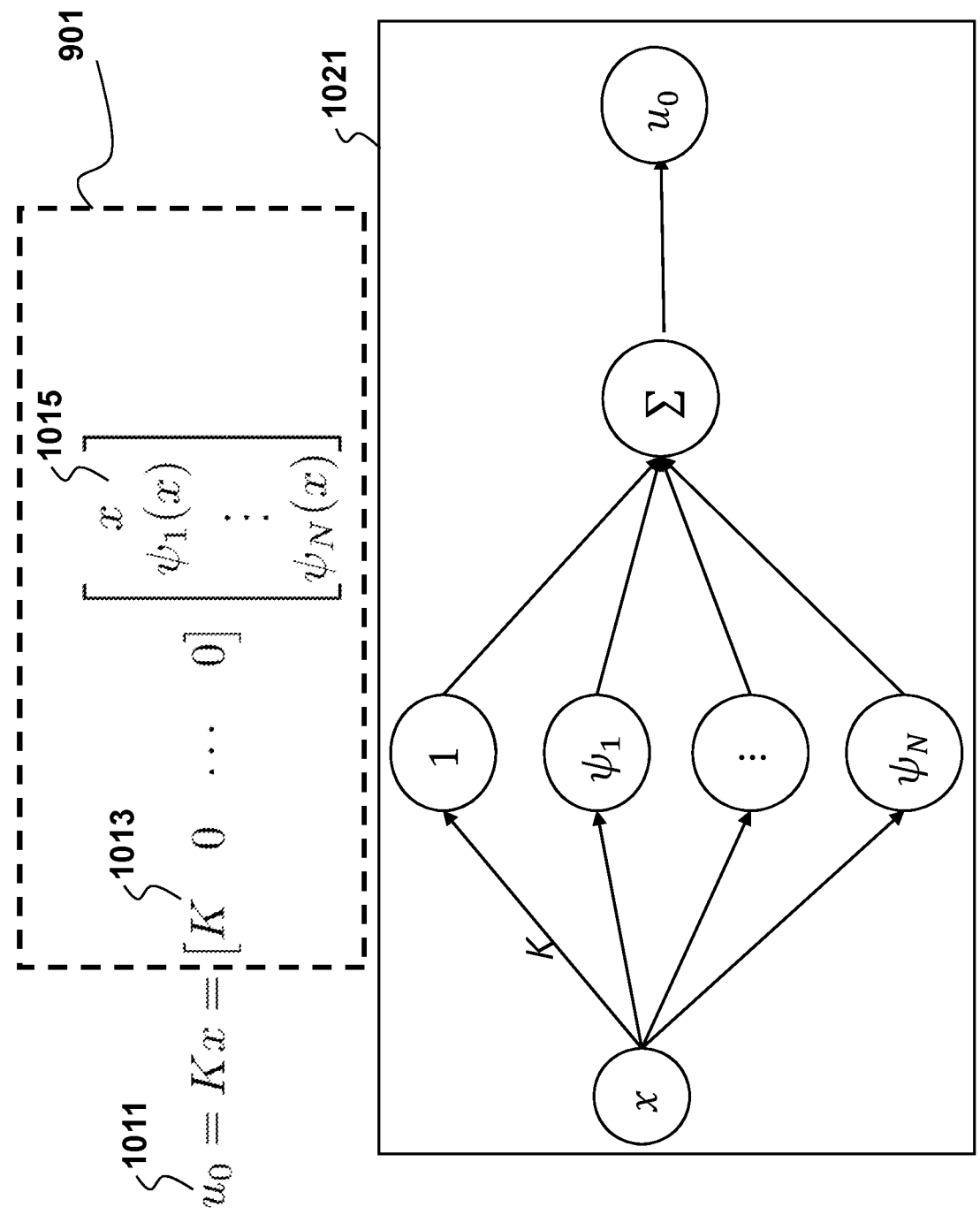
FIGS. 10A and 10B is a representation of a linear control policy as a specific realization of a function approximator such as a neural network, according to some embodiments.
Figure 10B:
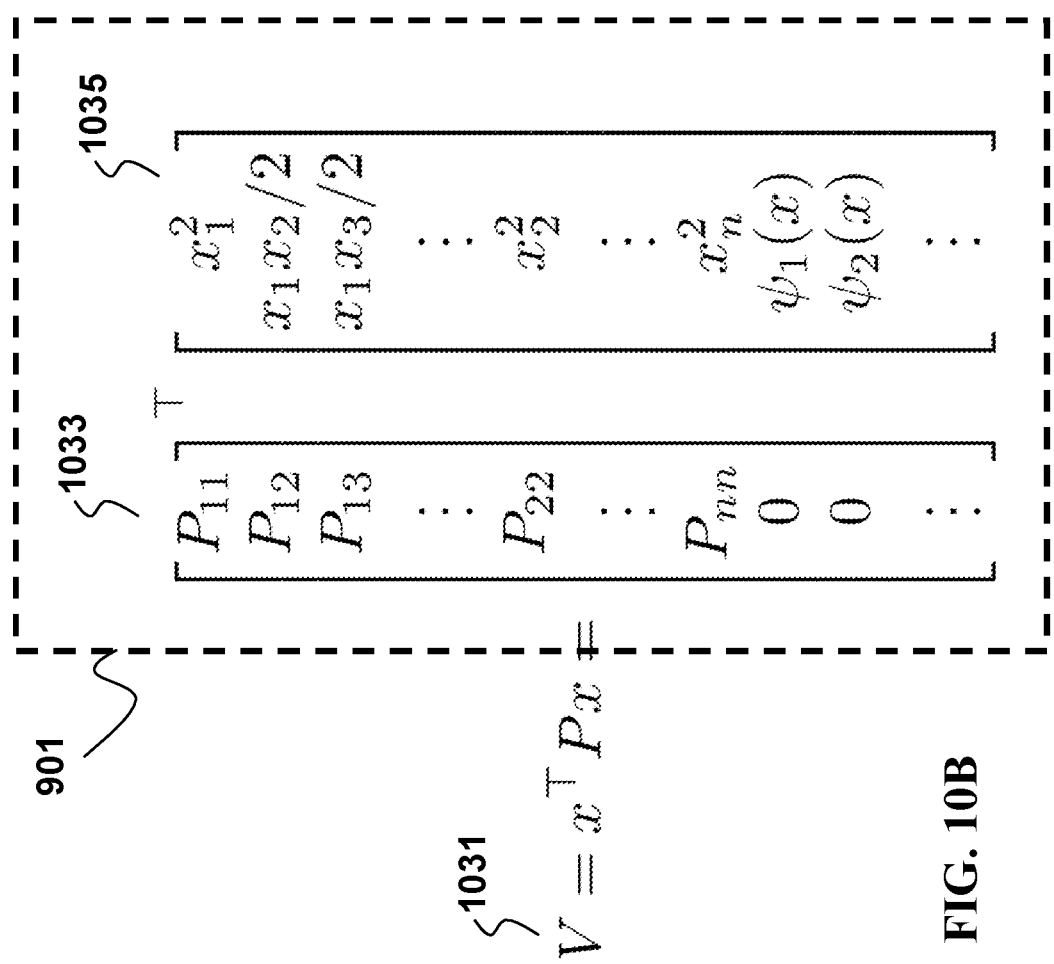

FIGS. 10A and 10B show schematics of exemplar parametric functions 901 approximating a control policy according to some embodiments. illustrates how a control policy, and in one embodiment, the initial control policy, can be represented using a function approximator 901. FIG. 10A shows that a linear control policy, as obtained by solving SDPs, is a specific case of a function approximator 1011, with coefficients given by 1013 where some coefficients are set to the elements of the initial control policy matrix $K_0$ and others are set to zero. Additionally, it is shown that irrespective of basis functions $\psi_i(x)$ for $i \in \mathbb{N}$, at least one basis function must be linear in the state 1015 x. In one embodiment, a single-hidden-layer neural network 1021 with input layer being the state of the machine and output layer being the control is the approximator 901. For example, the parametric function 901 is a neural network and the coefficients of the parametric function are weights of the neural network. Additionally, or alternatively, the parametric function is a polynomial regressor and the coefficients of the parametric function are coefficients of the regressor.

FIG. 10B provides the equivalent form for the initial value function 1031, wherein the approximator has coefficient weights 1033 set initially to zeros except for the elements of P, and the corresponding basis functions 1035 are open to the designer, but contain terms of x up to degree 2 which have non-zero P elements. In such a manner, the initialized control policy can be designed as a linear control policy having a gain mapping a state of the machine to a control input to the machine. In such an implementation, the initial coefficients of the parametric function are defined by the gain and at least one basis function from the set of basis function is linear in the state of the machine. In addition, the initial coefficients of the parametric function include zero coefficients that after update represents a non-linear control policy.

According to some embodiments, $u_0 = K_0 x$ is an admissible control policy and a function approximator $$\mathcal{J}_k(x) = \omega_k^T \psi(x)$$

where $\psi(x)$ are a set of differentiable basis functions (equivalently, hidden layer neuron activations) and $\omega_k$ is the corresponding column vector of basis coefficients (equivalently, neural network weights). The initial weight vector is, therefore, $\omega_0$. With the approximator initialized as above, the policy evaluation step is $$\omega_{K+1}^T(\psi(x_t) - \gamma\psi(x_{t+1})) = \mathcal{U}(x_t, u_k(x_t))$$

from which one can solve for $\omega_{K+1}^T$ using state and input data on-line. One embodiment is a recursive solution given by $$\omega_{k+1} = \omega_k - \eta_k \varphi_k (\omega_k^T - \mathcal{U}(x_t, u_k(x_t))$$

where $\eta_k > 0$ is a learning rate parameter that is usually selected to be an element from a convergent sequence of $\eta$'s, and $$\varphi_k = \psi(x_t) - \gamma\psi(x_{t+1}).$$

Subsequently, the policy improvement step is replaced by $$u_{k+1} = \arg\min_u (\mathcal{U}(x_t, u(x_t)) + \gamma \omega_{k+1}^T \psi(x_{t+1})).$$

This minimization problem is typically non-convex and therefore, challenging to solve to optimality. In one embodiment, when the cost function is quadratic, that is $$\mathcal{U}(x_t, u_t) = x_t^T Q x_t + u_t^T R u_t.$$

Then the policy improvement step becomes considerably simpler to execute, namely $$u_{k+1}(x) = -\frac{\gamma}{2} R^{-1} B^T \nabla \psi(x)^T \omega_{k+1}.$$

This can be evaluated as R and B are known, and $\psi$ is differentiable and chosen by the user.

Since $u_0$ is designed to be a safe control policy, we know that if the optimal value function and the optimal control policy are dense in the space of functions induced by the basis function expansions, then the weights of the function approximator employed in the ADP steps converges to the optimal weights. However, for the initial design to be safe, we need to estimate the quantity L in the SDPs accurately.

FIG. 11 shows a schematic illustrating a class of functions used by some embodiments. These functions are called Lipschitz continuous functions. When the Lipschitz continuous function ϕ has one component, then the scalar L* is called a global Lipschitz constant or a Lipschitz constant 1111 for the function if it is the smallest positive scalar that satisfies the inequality 1101 for any $x_1$ and $x_2$ in the function's domain. If the function ϕ has multiple components, and each component satisfies a corresponding inequality 1121 for any $x_1$ and $x_2$ in the function's domain, then the function has multiple Lipschitz constants 1131, one for each component.

Figure 12:
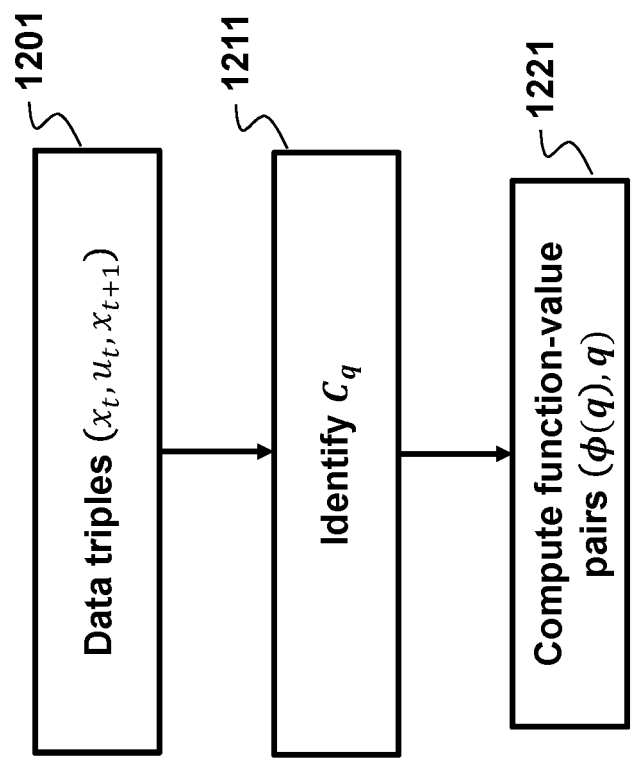
FIG. 12 is a schematic that shows how to obtain function-value pairs from state and input data, according to some embodiments.

FIG. 12 shows a schematic of estimating function-value pairs of the unmodeled dynamics used by some embodiments to estimate Lipschitz constant. of the training data 1201 can be legacy, archival and/or historical data generated by the system during prior experiments, not necessarily related to the task specific to which the optimal control policy is being designed. The training dataset 1201 includes unique state-input pairs along with corresponding state update information, not necessarily from a continuous trajectory or even the same operational run. For each data 1201 triple $(x_t, u_t, x_{t+1})$, some embodiments estimate the unmodeled dynamic term $$\phi(q_t) = G^+(x_{t+1} - Ax_t - Bu_t)$$

because the embodiments know or choose matrices G, A and B. Here $G^+$ is a left-inverse of G; in some embodiments, this could be the Moore-Penrose pseudoinverse. Some embodiments also estimate the matrix $C_q$ 1211. While estimating the exact elements of these matrices is quite challenging, the embodiments estimate the non-zero elements in the matrices, which is enough to design safe initial control policies, because the exact elements of $C_q$ are subsumed within the Lipschitz constant. The problem of estimating the sparsity pattern of $C_q$ is analogous to the problem of feature selection and sparse learning, known as automatic relevance determination (ARD). The basic idea in ARD is to give feature weights some parametric prior densities; these densities are subsequently refined by maximizing the likelihood of the data. For example, one can define hyperparameters which explicitly represent the relevance of different inputs to a machine learning algorithm with respect to the desired output (e.g., a regression problem). These relevance hyperparameters determine the range of variation of parameters relating to a particular input. ARD can then determine these hyperparameters during learning to discover which inputs are relevant. From $C_q$, some embodiments compute $q_t$ from $x_t$, and therefore, generate function value pairs $(q_t, \phi(q_t))$ 1231 with which Lipschitz constants can be estimated. Each function value pair determine for each corresponding triple of the training data defines a value of unmodeled dynamics for each corresponding triple of the training data and a corresponding value of a state of the machine.

Figure 13:
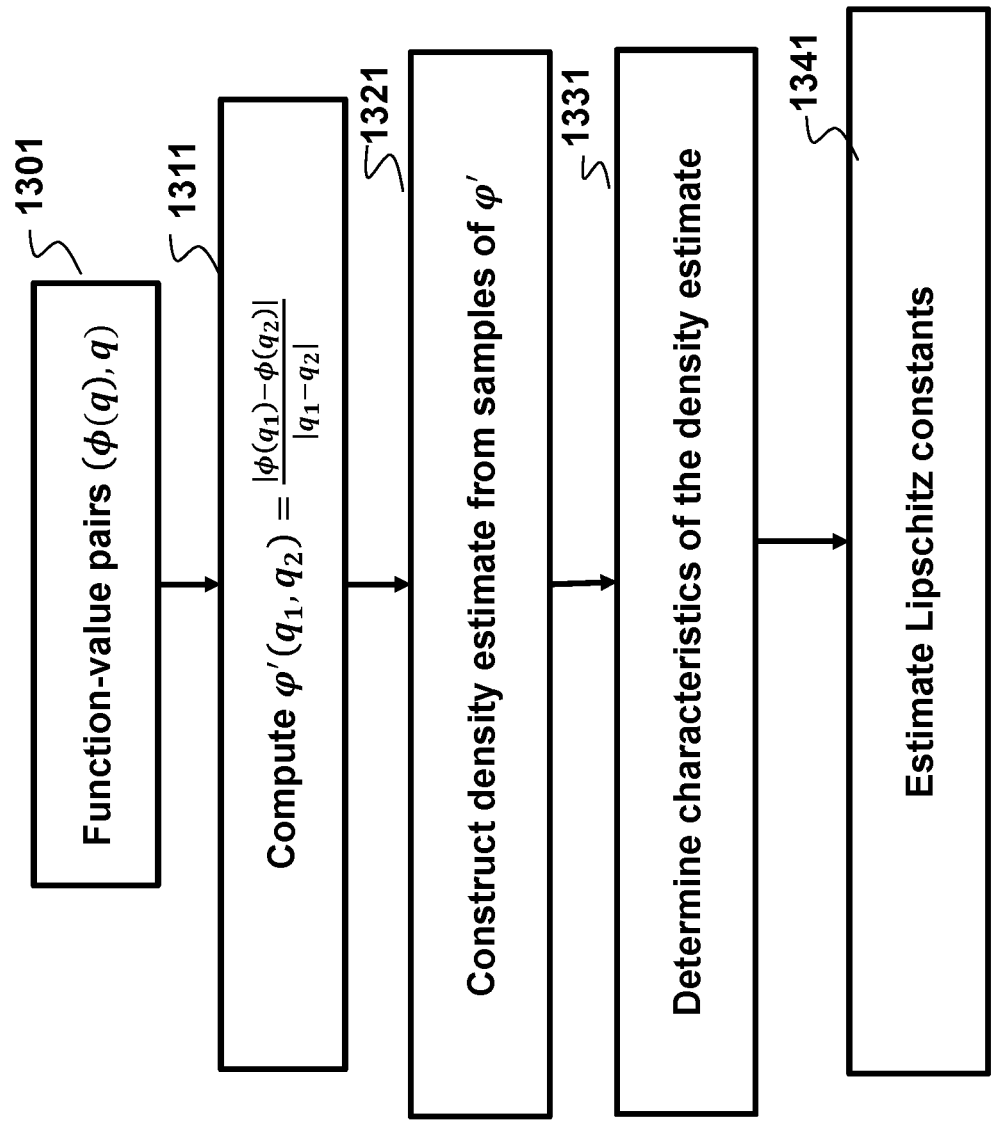
FIG. 13 is a flowchart describing the key steps involved in estimating Lipschitz constants from function-value pairs using density estimates, according to some embodiments.

FIG. 13 is a flowchart of a method for estimating Lipschitz constants from N function-value pairs 1231 obtained from training data according to some embodiments. From each function value pair 1301, underestimates of each of the Lipschitz constants are computed using the estimator 1311 that determines for each pair of triples of the training data a ratio of a distance between values of unmodeled dynamics determined for the pair of triples to a distance between values of the states in the pair of triples given by $$\varphi'_{jk} = \frac{|\phi(q_j) - \phi(q_k)|}{\|q_j - q_k\|}, \quad (3)$$

where $k \in \{1, \ldots, N\} \setminus j$. The sequence of $\varphi'_{jk}$ are empirical samples drawn from an underlying univariate density L which must be constructed 1321 from these samples. The true density function L has finite endpoints (support); indeed, its left endpoint is a non-negative scalar and its right-hand endpoint is the Lipschitz constant. Next, after the density function is estimated, some embodiments determine 1331 characteristics such as the endpoint of the distribution 1331 of the density function. For example, one embodiment fits the density directly from local estimates and the data in a non-parametric manner using kernel density estimation (KDE). Density-specific characteristics can then be leveraged in some embodiments to yield estimates of the Lipschitz constant 1341.

Figure 14:
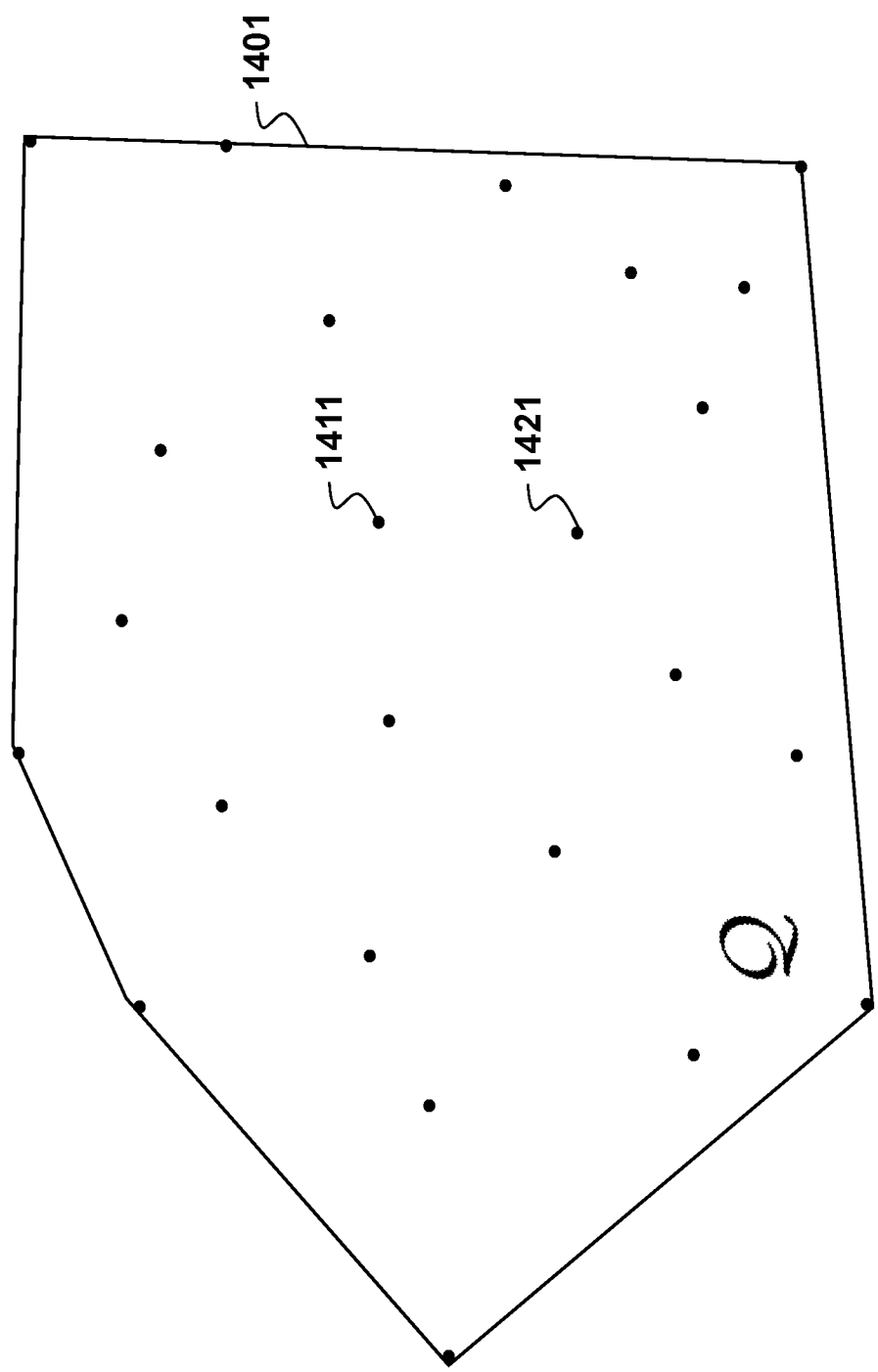
FIG. 14 is an example of data and its surrounding convex hull, according to some embodiments.

FIG. 14 shows the convex hull Q 1401 of the underestimates (3). According to some embodiments, the global Lipschitz constant of the unmodeled dynamics φ must be the same as the local Lipschitz constant of the unmodeled dynamics ϕ on the convex hull Q. That is, there must be some pair of values $q_+$ 1411 and $q_-$ 1412 inside the convex hull 1401 such that $\phi_\pm' = L^*$, although the pair $q_+$ and $q_-$ may not be amongst our data pairs 1301. In other words, the data contained in the convex hull 1401 is well-dispersed to justify its utility in Lipschitz constant estimation.

In some embodiments, the data obtained may be noisy/corrupted with noise. Fitting a regression/surrogate function to the noisy function values and using the predictions of the surrogate function at each data point 1231 to replace the noisy measurements can then be a viable option. With enough noisy data for training and cross-validation, the resulting surrogate function is expected to be less noisy, so the underestimators can be used without severe quality degradation. Surrogate functions include neural networks, support vector regression, Gaussian process regression, to name a few.

Figure 15:
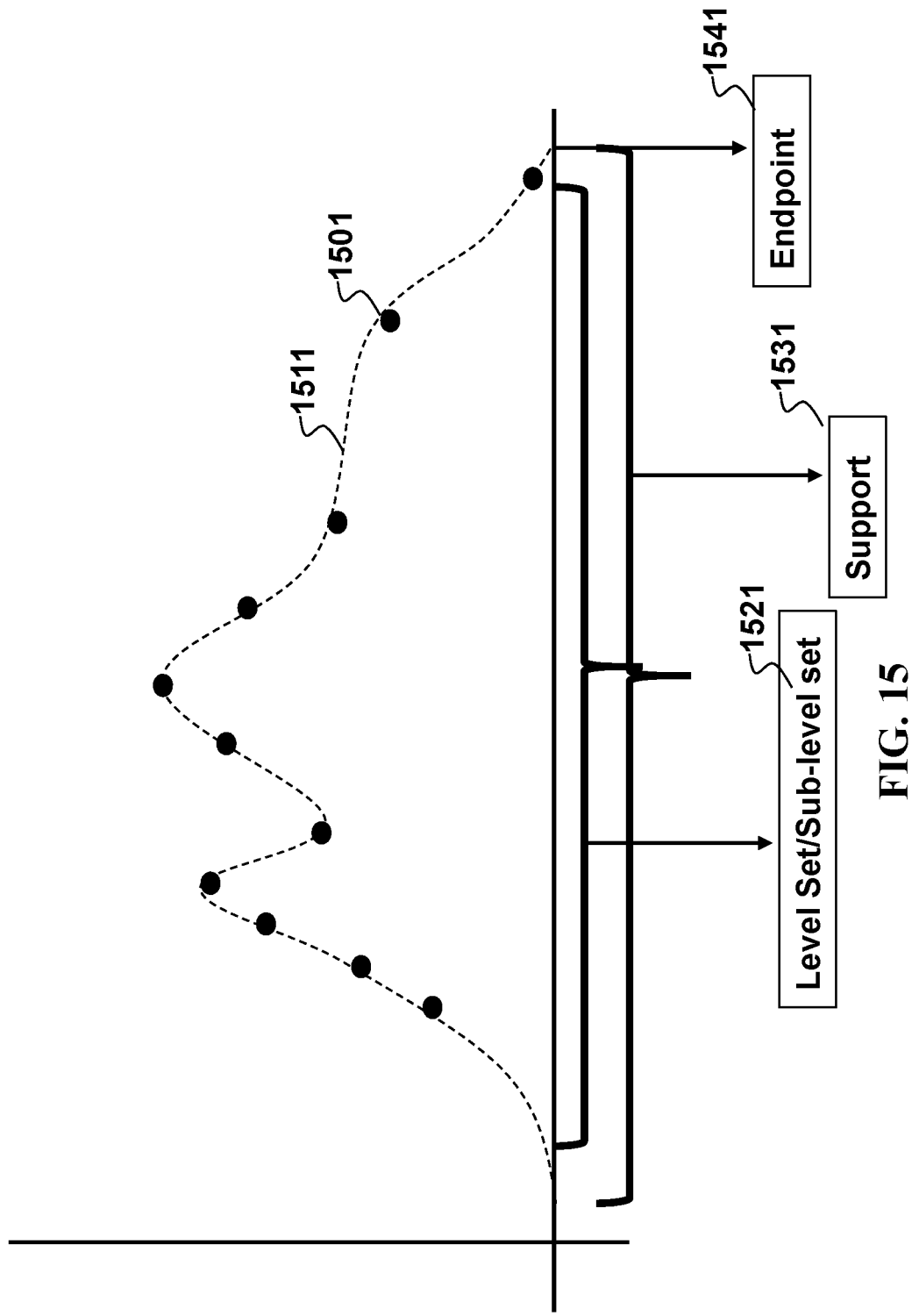
FIG. 15 is an example of a density estimator constructed via data, along with some characteristic properties of the density estimate, such as level sets, supports, and endpoints, according to some embodiments.

FIG. 15 shows a schematic of a density estimation and computation of Lipschitz constant estimates using characteristics of the density according to some embodiments. With a set of n underestimates 1501, the embodiments generate an estimate $\hat{L}^*$ of the true density L using a density estimator 1511 such as, a nonparametric density estimator, which is in some embodiments, a kernel density estimator $$\hat{L} = \frac{1}{nh} \sum \frac{\mathcal{K}(\varphi' - \varphi'_r)}{h}$$

where $\mathcal{K} : \mathbb{R} \to \mathbb{R}$ is a smooth function called the kernel function and h>0 is the kernel bandwidth. A plug-in estimate 1531 of the support S of the true density L is $$\hat{S} := \{\varphi' \geq 0 : \hat{L}^*(\varphi') \geq \beta_n\}$$

where $\beta_n$ is an element of a sequence of positive elements that converges to zero as n→∞. Then, if one picks $\beta \equiv \beta_n$ small enough, one can easily generate an estimated support $\hat{S}$ 1531. Then the Lipschitz constant estimate is $\hat{L}^* := \max \hat{S}$, which is its right-hand endpoint 1541. Another embodiment estimates level sets of the density estimate 1521 to generate Lipschitz constant estimates. In such a manner, in various embodiments, the characteristic of the probability density function used by the density estimator to estimate the Lipschitz constant is one or combination of the largest endpoint, the support, a level set, or a sub-level set. Notably, in embodiments where the value of unmodeled dynamics is a multi-dimensional vector, and the Lipschitz constant is determined component-wise to produce a set of Lipschitz constants for each dimension of the unmodeled dynamics.

FIG. 16 is a pseudocode of the implementation 1601 of an embodiment of KDE based Lipschitz estimation, also referred to as Lipschitz learning.

Figure 17:
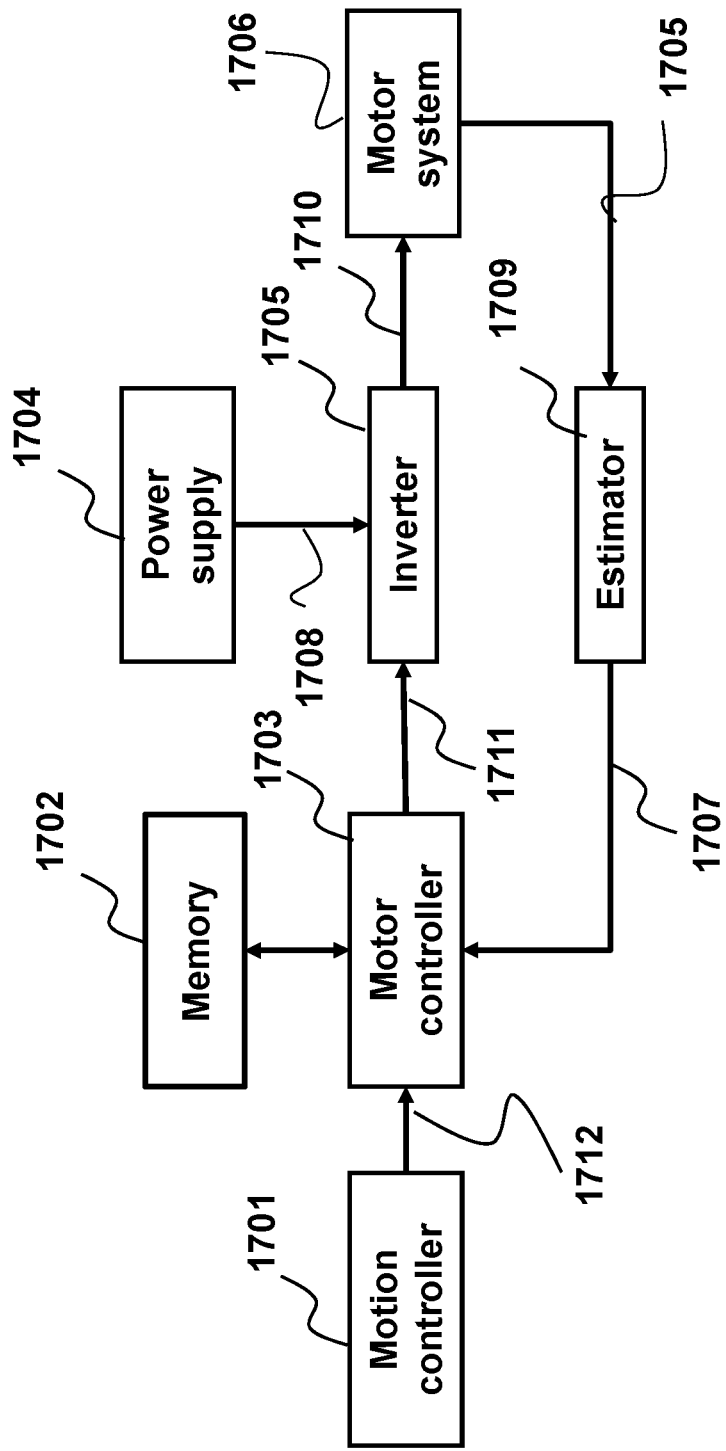
FIG. 17 is a block diagram of a motor drive to control an electromechanical motor using a data-driven controller employing principles of some embodiments.

FIG. 17 shows a block diagram of a motor drive to control an electric motor according to some embodiments. A motion controller 1701 generates reference signal 1712 to a motor controller 1703, where reference 1712 typically is a reference speed of the motor, e.g., a reference angle speed of the rotor of the motor, or reference angle of the rotor of the motor. Reference signal 1712 specifies how the reference changes over time. Examples of the motion controller include an interface for accepting the reference signal, a processor to produce the reference signal based on operation requirements of a system operated by the motor, a reference governor to modify input signals to the motor to satisfy dynamic constraints of the motor. Based on the reference signal 1712 and parameters 1707 which represents real-time operation status of motor 1706, motor controller 1703 generates a command signal 1711 to inverter 1705, according some algorithms stored in memory 1702. According to command signal 1711, the inverter generates electric voltages 1710 supplied to motor system. Power supply 1704, either in direct current or alternating current, provides electricity power to the inverter.

In some embodiment, the motion controller 1701 takes coordinates of a target position for a machine tool to end and a time period for the movement to take, converts the coordinates of the target position into a set of target angles for the motor to move, and determines the angular velocity reference profile, position reference profile, or torque reference profile 1712 of the motor. A velocity, position, torque profile describes how the velocity, position, torque changes over the period of time, respectively.

In some embodiment, the command signal 1711 specifies desired voltages sent to the motor, in which case, the inverter is a voltage power source. In another embodiment, the command signal 1711 specified desired current sent to the motor, in which case, the inverter is a current power source. When the inverter is a voltage source, the desired voltages could be represented in d-axis and q-axis of the motor, or phase voltages of the motor. Similarly, when the inverter is a current source, the desired current could be represented in d-axis and q-axis of the motor, or phase currents of the motor. The inverter, as a voltage source, is subject to constraints on the amplitude of the output phase voltage. The inverter, as a current source, is subject to constraints on the output phase current. These constraints appear as restrictions on the control input, represented by u in (1), in the dynamic model for the motor, represented by (1). Ideally, a controller should implement a policy respecting these constraints. A failure to respect these constraints may cause performance degradation or even loss of safety or stability.

In some embodiment, the motor operation status is inferred 1709 by an estimator from a measured signal 1705. In some embodiment, signal 1705 is generated by current transducers measuring phase currents of the motor or voltage sensors sensing the phase voltages of the motor, and an encoder measuring the rotation angle of the rotor. In some embodiment, signal 1705 is generated by magnetic field sensors. In another embodiment, reference 1712 could comprise of a reference flux of the rotor, and a reference torque to be generated by the motor.

In some embodiment, the motor controller determines the command signal 1711 based on a dynamic model of the motor, which in many cases cannot be obtained exactly. Typically, a simplified dynamic model of the motor is established on the basis of various assumptions. For instance, the motor is assumed to have a linear inductance. This assumption, in reality, is invalid, because the inductance is essentially a nonlinear function of current passing through the motor: the larger the current is, the smaller the inductance. Such a linear assumption however can greatly simplifies the design of control policy, because it circumvents the difficulty arising from the nonlinearity. It however necessarily causes performance degradation.

Practicing the taught method can end up with a control policy which takes care of nonlinearity ignored in the simplified dynamic model, and thus improves the performance of motor operation. Steps to practice the taught method can be summarized as follows. First a conservative control algorithm is designed based on the simplified dynamic model where the characteristics of the unmodeled nonlinearities/dynamics are captured by estimated bounds. For motor drives, $\phi(q)$ in (1) characterizes the unknown nonlinear dependence of inductance on current q, but its bound is used to determine the conservative control algorithm for simplification. Next, operating the motor in a restricted region with the conservative control, data are collected online for the estimation of Lipschitz constant of nonlinearities, with respect to measured signals. In order to capture inductance as a function of currents, one has to measure currents. Given the estimation of Lipschitz constant, one can design an initial control policy which ensures safe operation of the motor. Thirdly, the policy iteration-based learning procedure can be followed to update a sequence of new control policies, deploy the new control policies, and ultimately construct optimal control policy as the iteration goes to infinity, based on collecting operation data online.

In another embodiment, the motor controller determines the command signal 1711 based on a dynamic model of the motor where the friction effect of the rotor or load is neglected or simplified. In this case, the unknown function $\phi(q)$ in (1) characterizes the unmodeled friction effect, which depends on the rotor speed, a measured signal. Lipschitz constant of the unmodeled friction term can be better estimated by operating the motor with proportional, integral, derivative control, which can further facilitate the policy iteration for optimal control policy.

Figure 18:
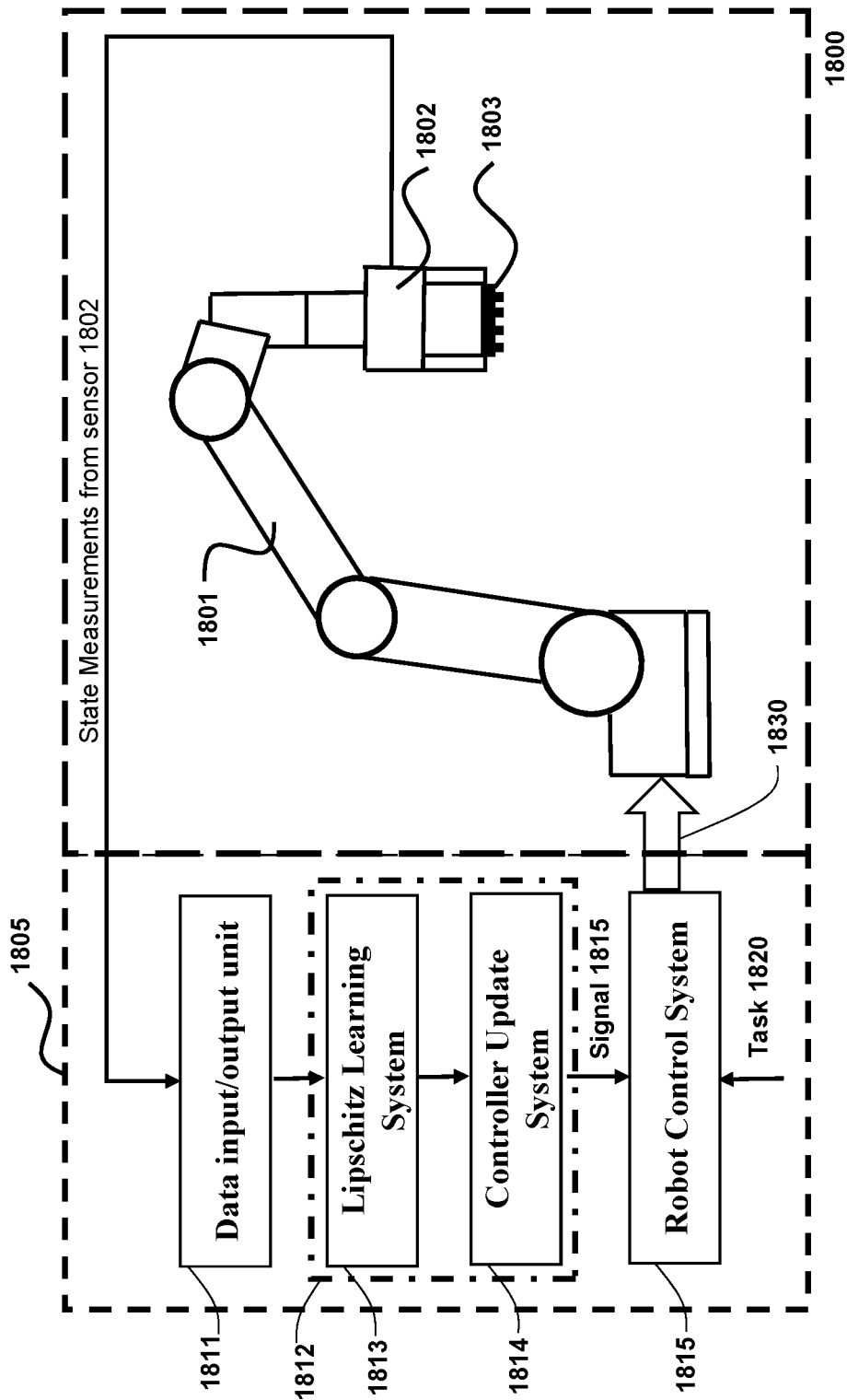
FIG. 18 is a block diagram of a robotic system which is performing a task of pick and place in a constrained environments employing principles of some embodiments.

FIG. 18 shows a schematic for a robotic system 1800 where the task 1820 of the robot is to pick and place some object 1803 from point A to point B. This is a repetitive task that the robot has to perform over and over again for a specified period of time. Such manipulation operations are commonplace in industrial environments. The robot control system 1815 sends a set of command signals, i.e., the joint torques that the robot has to apply at each joints so that the robot can move the workpiece 1803 from point A to B. The control signals are sent from the robot controller to the robot via a wired communication network 1830.

In these tasks, the robot is provided a part 1803 to be manipulated in a fixed pose using a part feeding system. The robot then grips the object in a predetermined fashion and then the object is manipulated to a desired state. The object 1803 may be provided to the robot in an initial configuration with some uncertainty in its pose between consecutive trials. This uncertainty in the pose of the object as well as failure to grip the object in exactly the predefined fashion leads to modeling uncertainty. Furthermore, the model of the robot may not be completely known. Both these factors lead to the uncertain term $\phi(q)$ in (1).

The robot has to operate in presence of human operators and/or other obstacles (other robots, other machineries) and this defines the state constraints that the robot should always respect.

The task requires computation of a trajectory that allows the robot to manipulate the object 1803 to the desired state while respecting the state constraints (i.e., avoiding collisions). This trajectory is followed by controllers that generate torques to move the robot along the desired trajectory. A mismatch in the known model and actual model leads to poor performance and in the worst case, may result in collision of the robot with other objects/human in the environment.

The robot collects the information about its state and the object using sensing system 1802 which is then transmitted to a data input/output unit 1811 using a communication system 1802. The collected data is passed to the learning system 1812, which consists of Lipschitz learning system 1813 and a controller update system 1814. The Lipschitz learning system 1813 is only active during the initial commissioning of the robot when the learning system is estimating the Lipschitz constant for the unknown dynamics of the robotic system. Once the Lipschitz learner has estimated the Lipschitz constant, an initial conservative controller is synthesized by the controller update system 1814 which is then sent to the robot by the robot control system 1815. The data collected during the operation of the robotic system is then fed back to the controller update system 1814 which performs an update of the controller and sends the new controller to the robot. This iterative procedure is repeated till the optimal controller is obtained for the system. In the asymptotic limit this iterative procedure designs the controller that leads to optimal performance of the robotic system and is safe during learning.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A control system for controlling a machine with partially modeled dynamics to perform a task, comprising:
an input interface configured to accept training data of operation of the machine, each instance of the training data is indicative of a triple of a state of the machine, a control input applied to the machine at the state of the instance, and an update of the state of the machine in response to the applied control input of the instance;
a processor configured to
estimate at least one Lipschitz constant bounding the unmodeled dynamics of the machine, wherein the unmodeled dynamics cause a difference between a measured state of the machine and a predicted state of the machine estimated with a partial model of dynamics of the machine;
initialize a constraint-admissible control policy using the Lipschitz constant for controlling the machine to perform a task, such that the constraint-admissible control policy satisfies a stability constraint and a safety and admissibility constraint including one or combination of a state constraint and an input constraint, and has a finite cost on the performance of the task; and
jointly control the machine and update the control policy to control an operation of the machine to perform the task according to the control policy starting with the initialized constraint-admissible control policy and to update the control policy using data collected while performing the task, wherein the updated control policy is constraint-admissible, wherein the control of the machine includes submitting a command signal to the machine to perform the task and the data collected while performing the task are obtained from sensors measurement corresponding to the state of the machine.

2. The control system of claim 1, wherein the processor updates the control policy until a termination condition is met, wherein upon meeting the termination condition the control policy is a constraint-admissible optimal control policy, and wherein, after meeting the termination condition, the processor controls the machine with the constraint-admissible optimal control policy.

3. The control system of claim 2, wherein the initialized control policy is a constraint-admissible linear control policy, while, upon meeting the termination condition, the constraint-admissible optimal control policy is a constraint-admissible non-linear optimal control policy.

4. The control system of claim 1, wherein the instances of the training data do not belong to a continuous trajectory of operation of the machine.

5. The control system of claim 1, wherein the control policy is represented by a parametric function of a weighted combination of a set of basis functions, wherein the initialized control policy defines initial coefficients of the parametric function and the update of the control policy updates the coefficients of the parametric function.

6. The control system of claim 5, wherein the parametric function is a neural network and the coefficients of the parametric function are weights of the neural network.

7. The control system of claim 5, wherein the parametric function is a polynomial regressor and the coefficients of the parametric function are coefficients of the regressor.

8. The control system of claim 5, wherein the initialized control policy is a linear control policy having a gain mapping a state of the machine to a control input to the machine, wherein the initial coefficients of the parametric function are defined by the gain and wherein at least one basis function from the set of basis function is linear in the state of the machine.

9. The control system of claim 1, wherein for estimating of a Lipschitz constant the processor is configured to
- determine a value of unmodeled dynamics for each corresponding triple of the training data;
- determine for each pair of triples of the training data a ratio of a distance between values of unmodeled dynamics determined for the pair of triples to a distance between values of the states in the pair of triples;
- estimate a probability density function of the determined ratios using a density estimator; and
- select a characteristic of the probability density function as the Lipschitz constant.

10. The control system of claim 9, wherein the value of unmodeled dynamics is a multi-dimensional vector, and wherein the Lipschitz constant is determined component-wise to produce a set of Lipschitz constants for each dimension of the unmodeled dynamics.

11. The control system of claim 9, wherein the density estimator is a nonparametric density estimator.

12. The control system of claim 11, wherein the nonparametric density estimator is a kernel density estimator.

13. The control system of claim 9, wherein the characteristic of the probability density function is the largest endpoint, the support, a level set, or a sub-level set computed using the density estimator.

14. The control system of claim 1, wherein the processor is configured to initialize the control-admissible control policy by solving a semidefinite programming problem using partial model of dynamics of the machine and the estimate of the Lipschitz constant.

15. The control system of claim 1, wherein the machine includes an electric motor, such that the control system is a motor controller that determines a command signal based on a dynamic model of the electric motor.

16. The control system of claim 15, wherein the dynamic model of the electric motor accounts only for a linear inductance of the electric motor, and wherein the updated control policy accounts for a non-linear inductance.

17. The control system of claim 1, wherein the machine includes a robot, such that the control system determines a command signal based on a dynamic model of the robot.

18. The control system of claim 17, wherein the robot is configured for the task including picking an object, wherein the partially modeled dynamics of robot comes from one or combination of an uncertainty in a pose of the object, a failure to grip the object in a predefined fashion, and uncertainty of the model of the robot.

19. A control method for controlling a machine with partially modeled dynamics to perform a task, wherein the method uses a processor coupled with stored instructions implementing the method, wherein the instructions, when executed by the processor carry out steps of the method, comprising:
- accepting training data of operation of the machine, each instance of the training data is indicative of a triple of a state of the machine, a control input applied to the machine at the state of the instance, and an update of the state of the machine in response to the applied control input of the instance;
- estimating at least one Lipschitz constant bounding the unmodeled dynamics of the machine, wherein the unmodeled dynamics cause a difference between a measured state of the machine and a predicted state of the machine estimated with a partial model of dynamics of the machine;
- initializing a constraint-admissible control policy using the Lipschitz constant for controlling the machine to perform a task, such that the constraint-admissible control policy satisfies a stability constraint and a safety and admissibility constraint including one or combination of a state constraint and an input constraint, and has a finite cost on the performance of the task; and
- jointly controlling the machine and updating the control policy to control an operation of the machine to perform the task according to the control policy starting with the initialized constraint-admissible control policy and to update the control policy using data collected while performing the task, wherein the updated control policy is constraint-admissible, wherein controlling the machine includes submitting a command signal to the machine to perform the task and the data collected while performing the task are obtained from sensors measurement corresponding to the state of the machine.

20. A non-transitory computer readable storage medium embodied thereon a program executable by a processor for performing a method, the method comprising:
- accepting training data of operation of the machine, each instance of the training data is indicative of a triple of a state of the machine, a control input applied to the machine at the state of the instance, and an update of the state of the machine in response to the applied control input of the instance;
- estimating at least one Lipschitz constant bounding the unmodeled dynamics of the machine, wherein the unmodeled dynamics cause a difference between a measured state of the machine and a predicted state of the machine estimated with a partial model of dynamics of the machine;
- initializing a constraint-admissible control policy using the Lipschitz constant for controlling the machine to perform a task, such that the constraint-admissible control policy satisfies a stability constraint and a safety and admissibility constraint including one or combination of a state constraint and an input constraint, and has a finite cost on the performance of the task; and
- jointly controlling the machine and updating the control policy to control an operation of the machine to perform the task according to the control policy starting with the initialized constraint-admissible control policy and to update the control policy using data collected while performing the task, wherein the updated control policy is constraint-admissible, wherein controlling the machine includes submitting a command signal to the machine to perform the task and the data collected while performing the task are obtained from sensors measurement corresponding to the state of the machine.

* * * * *